United States Patent
Suzuki

(10) Patent No.: US 12,104,548 B2
(45) Date of Patent: Oct. 1, 2024

(54) ELECTRONIC CONTROL DEVICE AND ENGINE CONTROL SYSTEM

(71) Applicant: Hitachi Astemo, Ltd., Hitachinaka (JP)

(72) Inventor: Kunihiko Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 4 days.

(21) Appl. No.: 18/027,503

(22) PCT Filed: Aug. 27, 2021

(86) PCT No.: PCT/JP2021/031506
§ 371 (c)(1),
(2) Date: Mar. 21, 2023

(87) PCT Pub. No.: WO2022/074957
PCT Pub. Date: Apr. 14, 2022

(65) Prior Publication Data
US 2023/0407800 A1 Dec. 21, 2023

(30) Foreign Application Priority Data
Oct. 6, 2020 (JP) .................... 2020-169269

(51) Int. Cl.
*F02D 41/22* (2006.01)
*F02D 41/00* (2006.01)
*F02D 41/24* (2006.01)

(52) U.S. Cl.
CPC ........ *F02D 41/008* (2013.01); *F02D 41/0002* (2013.01); *F02D 41/0052* (2013.01);
(Continued)

(58) Field of Classification Search
CPC ............... F02D 41/008; F02D 41/0002; F02D 41/0052; F02D 41/22; F02D 41/2464; F02D 2200/0408; F02D 2200/101
(Continued)

(56) References Cited

U.S. PATENT DOCUMENTS 6,879,904 B2  4/2005  Muto et al.
9,726,093 B2  8/2017  Takezoe et al.
(Continued)

FOREIGN PATENT DOCUMENTS

JP   2002-202003 A   7/2002
JP   2004-197614 A   7/2004
(Continued)

OTHER PUBLICATIONS

International Search Report (PCT/ISA/210) issued in PCT Application No. PCT/JP2021/031506 dated Nov. 16, 2021 with English translation (seven (7) pages).
(Continued)

*Primary Examiner* — Hai H Huynh
(74) *Attorney, Agent, or Firm* — Crowell & Moring LLP

(57) ABSTRACT

Provided is an electronic control device that controls an engine including an EGR system that includes an EGR pipe and an EGR valve disposed in the EGR pipe, an air flow sensor provided in an intake pipe, a throttle valve on a downstream side of the air flow sensor, and an intake pipe pressure sensor that detects an intake pipe pressure. The electronic control device includes a state estimation unit that estimates the intake pipe pressure and an EGR rate based on at least a detection value from the air flow sensor and an EGR valve opening, and an estimation value correction unit that corrects an EGR rate estimation value from the state estimation unit based on a detection value from the intake pipe pressure sensor and an intake pipe pressure estimation value from the state estimation unit.

14 Claims, 17 Drawing Sheets

(52) U.S. Cl.
CPC ......... *F02D 41/22* (2013.01); *F02D 41/2464* (2013.01); *F02D 2200/0408* (2013.01); *F02D 2200/101* (2013.01)

(58) Field of Classification Search
USPC ....... 123/399, 568.19, 568.21; 701/103, 107, 701/108, 109, 111; 73/114.02, 114.31, 73/114.32, 114.33, 114.74
See application file for complete search history.

(56) References Cited

U.S. PATENT DOCUMENTS

| | | |
|---|---|---|
| 11,067,041 B2 | 7/2021 | Arakawa et al. |
| 2002/0087238 A1 | 7/2002 | Matsui |
| 2004/0122584 A1 | 6/2004 | Muto et al. |
| 2012/0303346 A1 | 11/2012 | Takezoe et al. |
| 2019/0368448 A1 | 12/2019 | Arakawa et al. |

FOREIGN PATENT DOCUMENTS

| | | | |
|---|---|---|---|
| JP | 2007-211746 A | 8/2007 |
| JP | 2007-239606 A | 9/2007 |
| JP | 2011-169196 A | 9/2011 |
| JP | 2013-11270 A | 1/2013 |
| JP | 2018-119403 A | 8/2018 |

OTHER PUBLICATIONS

Japanese-language Written Opinion (PCT/ISA/237) issued in PCT Application No. PCT/JP2021/031506 dated Nov. 16, 2021 (five (5) pages).

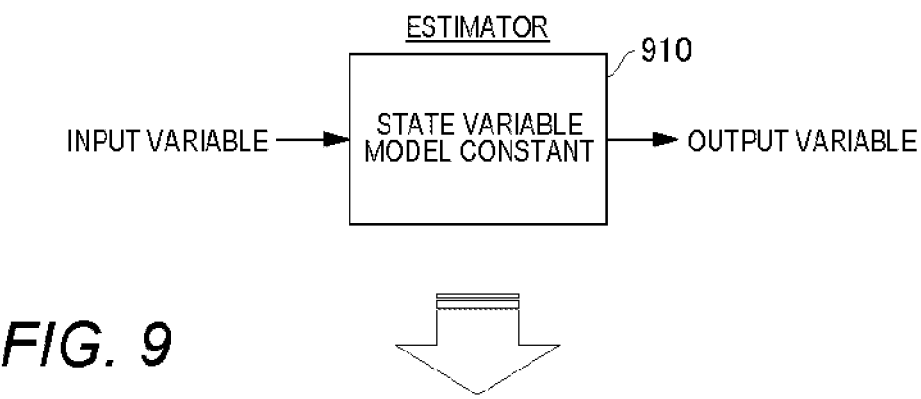
FIG. 9
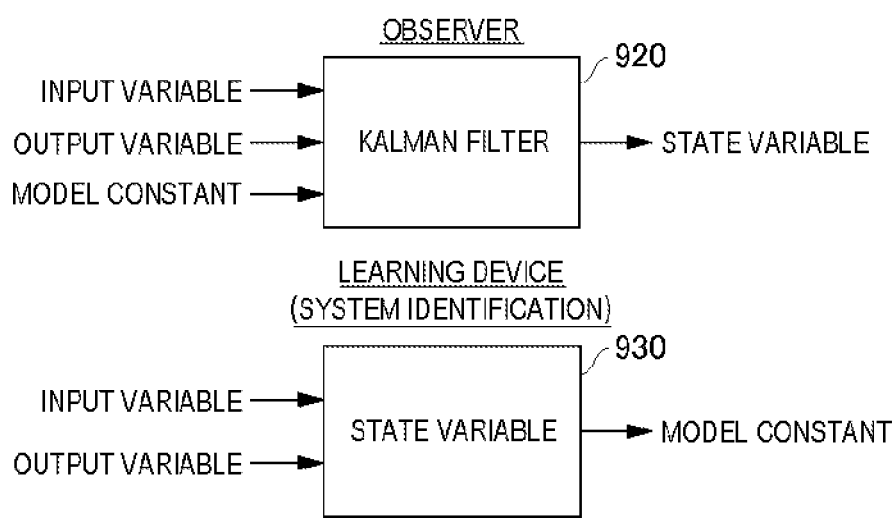

ELECTRONIC CONTROL DEVICE AND ENGINE CONTROL SYSTEM

TECHNICAL FIELD

The present invention relates to an electronic control device and an engine control system.

BACKGROUND ART

Conventionally, there is known a control technique for improving combustion performance of an internal combustion engine by returning (recirculating) a part of exhaust gas diverted from an exhaust pipe of the internal combustion engine to an intake pipe. In this control technique, a system is realized in which a fuel injection amount and an ignition timing are controlled based on a relationship between an amount of fresh air detected by an intake air amount sensor and an exhaust gas returning rate while controlling an amount of air sucked into an engine and a ratio of returning exhaust gas by a valve opening (see, for example, PTL 1).

CITATION LIST

Patent Literature

PTL 1: JP 2011-169196 A

SUMMARY OF INVENTION

Technical Problem

By increasing the exhaust gas returning rate (EGR rate), it is possible to increase effects such as reduction of a pump loss due to an influence of a throttle valve throttling at the time of a partial load operation and reduction of knocking at the time of a high load. On the other hand, when the EGR rate is excessively increased, problems such as unstable combustion and misfire occur. Furthermore, in a case where the EGR rate is lower than the control target value with an error, a sufficient knock reduction effect cannot be obtained, and a problem such as improper combustion such as knock occurs.

In the control system described in PTL 1, it is disclosed that the intake pipe pressure is estimated based on the relationship among the intake air amount sensor, the throttle valve opening, and the EGR valve opening, and the estimation value is compared with an actual measurement value by the intake pipe pressure sensor provided in the intake pipe to determine the presence or absence of abnormality of the EGR system. Further, the control system described in PTL 1 discloses a diagnosis technique for distinguishing between a fuel system abnormality and an EGR system abnormality by combining an estimation value of an intake pipe pressure and information of an air-fuel ratio sensor provided in an exhaust pipe. However, in the high EGR rate combustion system, high EGR control accuracy is required from the viewpoint of preventing the above-described knock and misfire. Therefore, it is necessary to maintain a highly accurate EGR control state by appropriately controlling the EGR control error in the normal range while detecting the EGR control error.

The present invention has been made in view of the above circumstances, and an object of the present invention is to maintain high EGR control accuracy and to prevent combustion failure of an internal combustion engine due to an EGR control error.

Solution to Problem

In order to solve the above problem, an electronic control device according to one aspect of the present invention is an electronic control device that controls an engine including an EGR system that includes an EGR pipe that returns a part of exhaust gas of an internal combustion engine to an intake pipe and an EGR valve disposed in the EGR pipe, an air flow sensor that detects a flow rate of air taken into the intake pipe, a throttle valve provided on a downstream side of the air flow sensor, and an intake pipe pressure sensor that is provided on a downstream side of the throttle valve and on a downstream side of a connection portion between the intake pipe and the EGR pipe and detects an intake pipe pressure that is a pressure downstream of the throttle valve in the intake pipe, the electronic control device including: a state estimation unit that estimates the intake pipe pressure and an EGR rate based on a detection value from the air flow sensor and an EGR valve opening; and an estimation value correction unit that corrects an EGR rate estimation value estimated by the state estimation unit based on a detection value from the intake pipe pressure sensor and an intake pipe pressure estimation value estimated by the state estimation unit.

Advantageous Effects of Invention

According to at least one aspect of the present invention, the estimation value correction unit corrects the EGR rate estimation value based on the detection value from the intake pipe pressure sensor and the intake pipe pressure estimation value. As a result, high EGR control accuracy can be maintained, and combustion failure (for example, knock or misfire) of the internal combustion engine due to the EGR control error can be prevented.

Objects, configurations, and effects other than those described above will be clarified by the following description of embodiments.

BRIEF DESCRIPTION OF DRAWINGS

FIG. 9 is a conceptual diagram illustrating functions used in constructing a control model that realizes internal state feedback control in block diagrams.

DESCRIPTION OF EMBODIMENTS

Figure 1:
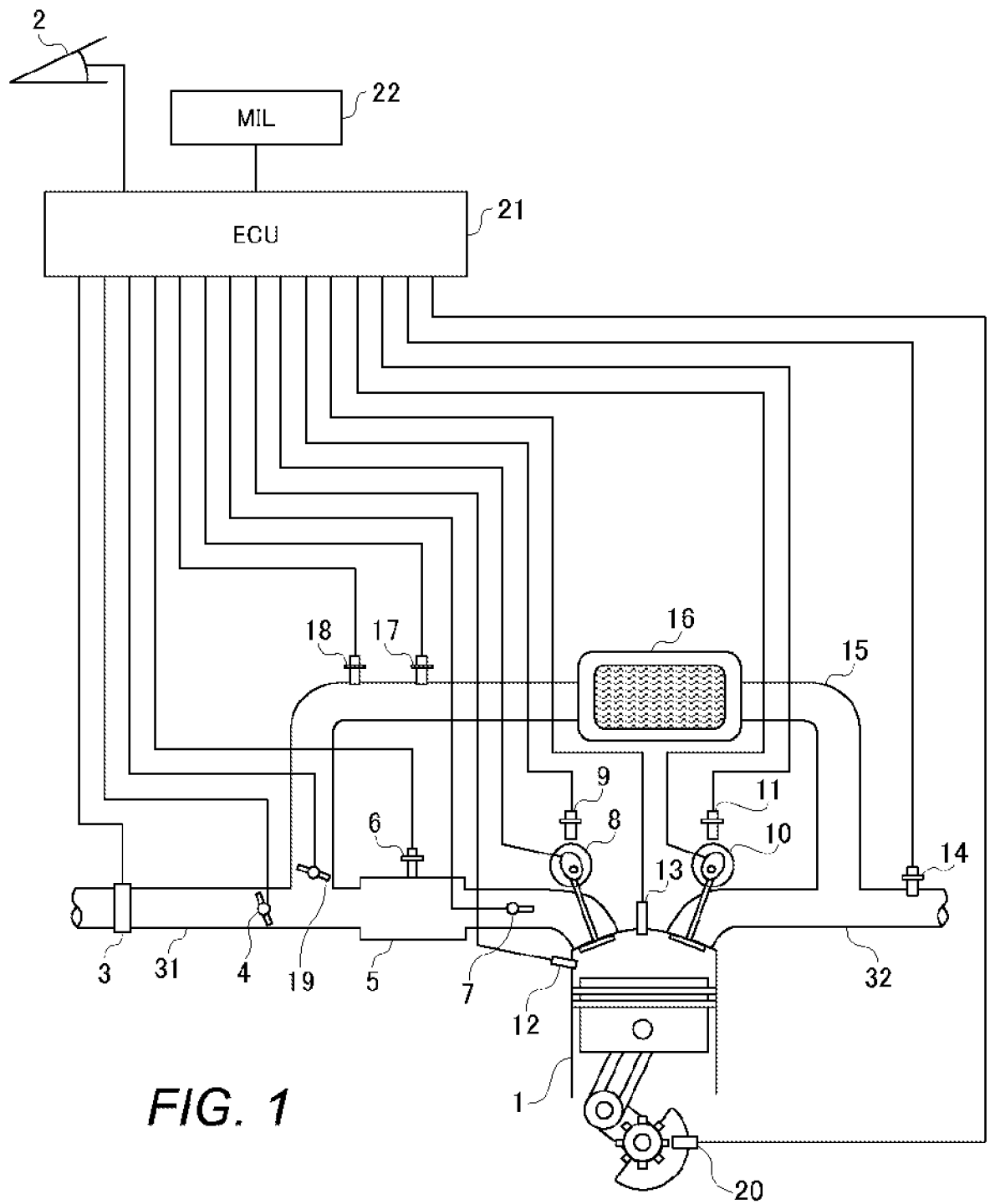
FIG. 1 is a schematic configuration diagram of an entire engine system to be controlled by an engine control system according to an embodiment of the present invention.

Hereinafter, examples of modes for carrying out the present invention will be described with reference to the accompanying drawings. In the present specification and the accompanying drawings, components having substantially the same function or configuration are denoted by the same reference numerals, and redundant description is omitted.

[Schematic Configuration of Engine System]

First, a configuration of an entire engine system to be controlled by an engine control system according to an embodiment of the present invention will be described with reference to FIG. 1.

FIG. 1 illustrates a schematic configuration example of an entire engine system to be controlled by an engine control system according to an embodiment of the present invention. The engine system includes an internal combustion engine 1, an accelerator position sensor 2, an air flow sensor 3, a throttle valve 4, an intake manifold 5, a flow enhancing valve 7, an intake valve 8, an exhaust valve 10, a fuel injection valve 12, an ignition plug 13, and a crank angle sensor 20. The engine system further includes an air-fuel ratio sensor 14, an exhausted gas recirculation (EGR) pipe 15, an EGR cooler 16, an EGR temperature sensor 17, an EGR valve upstream pressure sensor 18, an EGR valve 19, and an electronic control unit (ECU) 21.

The throttle valve 4 is provided upstream of an intake manifold 5 formed in an intake pipe 31, and controls an intake air amount flowing into a cylinder of the internal combustion engine 1 by narrowing an intake flow path. The throttle valve 4 is configured by an electronically controlled butterfly valve capable of controlling a valve opening independently of an accelerator pedal depression amount by a driver. The intake manifold 5 to which the intake pipe pressure sensor 6 is assembled communicates with the downstream side of the throttle valve 4.

The flow enhancing valve 7 is disposed downstream of the intake manifold 5, and enhances the turbulence of the flow inside the cylinder by generating a drift in the intake air sucked into the cylinder. When the exhaust gas recirculation combustion described later is performed, the flow enhancing valve 7 is closed to promote and stabilize the turbulent flow combustion.

The internal combustion engine 1 is provided with an intake valve 8 and an exhaust valve 10. Each of the intake valve 8 and the exhaust valve 10 has a variable valve mechanism for continuously changing a phase of valve opening and closing. An intake valve position sensor 9 and an exhaust valve position sensor 11 for detecting the opening/closing phase of the valve are respectively assembled to the variable valve mechanisms of the intake valve 8 and the exhaust valve 10. A cylinder of the internal combustion engine 1 includes a direct fuel injection valve 12 that directly injects fuel into the cylinder. The fuel injection valve 12 may be of a port injection type that injects fuel into the intake port.

In a cylinder of the internal combustion engine 1, an ignition plug 13 that exposes an electrode portion in the cylinder and ignites a combustible air-fuel mixture by a spark is assembled. The crank angle sensor 20 is assembled to the crankshaft, and outputs a signal corresponding to a rotation angle of the crankshaft to the ECU 21 as a signal indicating a rotation speed. The air-fuel ratio sensor 14 is provided in the exhaust pipe 32, and outputs a signal indicating the detected exhaust gas composition, that is, the air-fuel ratio to the ECU 21.

An EGR system including an EGR pipe 15 and an EGR valve 19 disposed in the EGR pipe 15 is configured. The EGR pipe 15 communicates between the exhaust flow path (intake pipe 31) and the intake flow path (exhaust pipe 32), diverts the exhaust gas from the exhaust flow path, and returns (recirculates) the exhaust gas to the downstream of the throttle valve 4. The EGR cooler 16 provided in the EGR pipe 15 cools the exhaust gas. The EGR valve 19 is provided downstream of the EGR cooler 16 and controls the flow rate of the exhaust gas. The EGR pipe 15 is provided with an EGR temperature sensor 17 that detects the temperature of the exhaust gas flowing upstream of the EGR valve 19 and an EGR valve upstream pressure sensor 18 that detects the pressure upstream of the EGR valve 19.

The ECU 21 is an example of an electronic control unit, and controls each component of the engine system and executes various data processing. The engine system and the ECU 21 constitute an engine control system. The above-described various sensors and various actuators are communicably connected to the ECU 21. The ECU 21 controls operations of actuators such as the throttle valve 4, the fuel injection valve 12, the intake valve 8, the exhaust valve 10, and the EGR valve 19. In addition, the ECU 21 detects an operating state of the internal combustion engine 1 based on signals input from various sensors, and causes the ignition plug 13 to ignite at a timing determined according to the operating state. Further, when detecting abnormality or failure in the engine system including the internal combustion engine 1, the ECU 21 turns on a corresponding warning display lamp 22 (MIL).

[Hardware Configuration of ECU]

Figure 2:
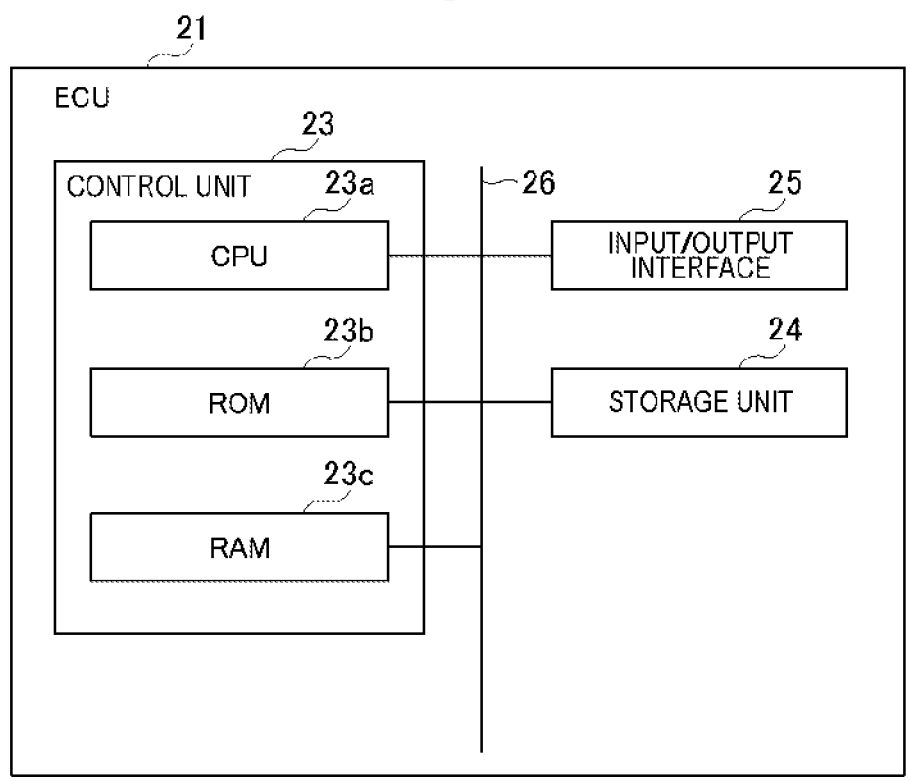
FIG. 2 is a block diagram showing a hardware configuration example of an ECU.

FIG. 2 is a block diagram illustrating a hardware configuration example of the ECU 21. The ECU 21 includes a control unit 23, a storage unit 24, and an input/output interface 25 connected to one another via a system bus 26. The control unit 23 includes a central processing unit (CPU) 23a, a read only memory (ROM) 23b, and a random access memory (RAM) 23c. The CPU 23a loads the control program stored in the ROM 23b into the RAM 23c and executes the program, thereby implementing the functions of the ECU 21. The storage unit 24 as an auxiliary storage device including a semiconductor memory or the like records a state space model, a parameter, data obtained by executing a control program, and the like. In addition, a control program may be stored in the storage unit 24.

The input/output interface 25 is an interface that communicates signals and data with each sensor and each actuator. The ECU 21 includes an analog/digital (A/D) converter (not illustrated) that processes input/output signals of each sensor, a driver circuit, and the like. The input/output interface 25 may also serve as an A/D converter. Although the CPU is used as the processor, another processor such as a micro processing unit (MPU) may be used.

[Relationship Between EGR Rate and Ignition Advance]

Here, the relationship between the EGR rate and the ignition advance will be described with reference to FIG. 3.

Figure 3:
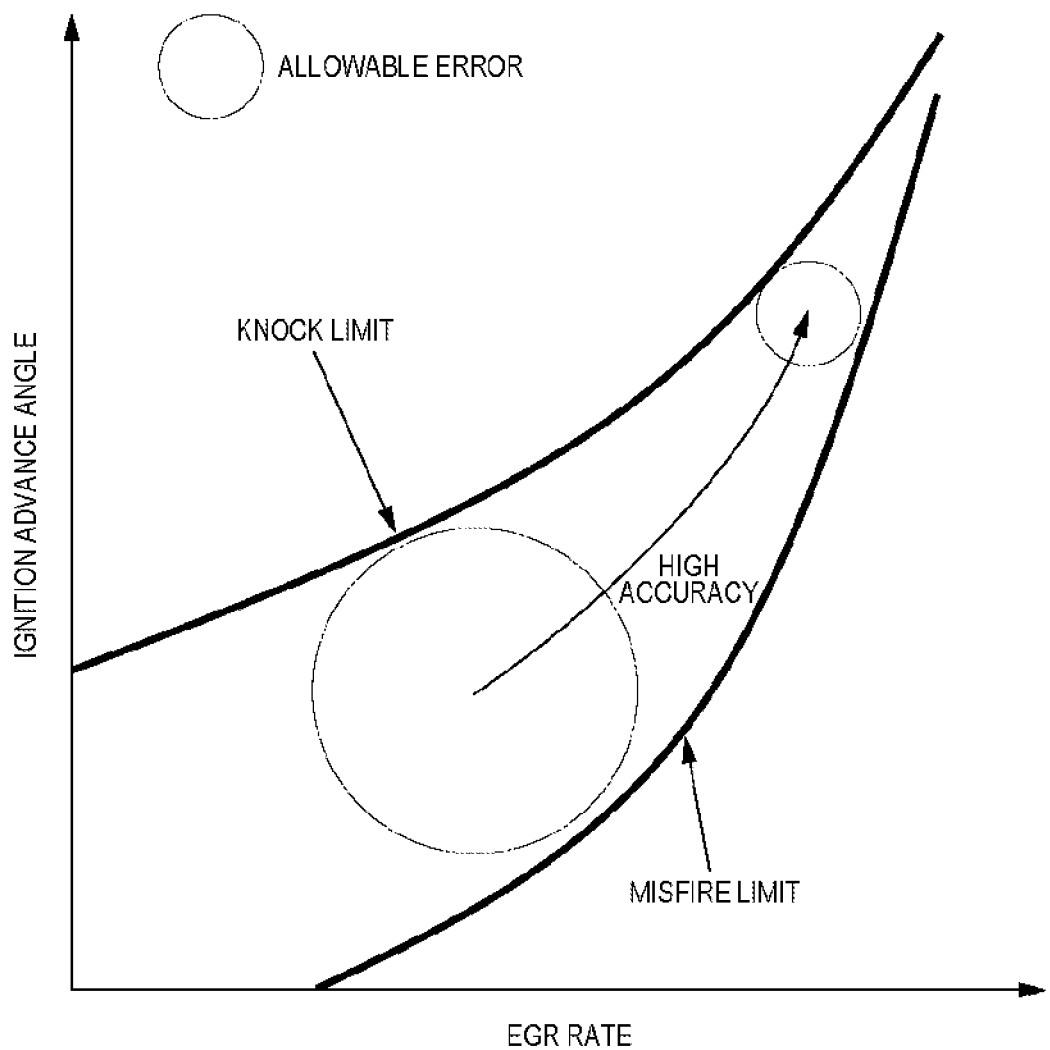
FIG. 3 is a graph showing a relationship between an EGR rate and an ignition advance.

FIG. 3 is a graph illustrating a relationship between an EGR rate and an ignition advance. The horizontal axis represents the EGR rate, and the vertical axis represents the ignition advance. The EGR rate represents a ratio of exhaust gas returned from the EGR pipe 15 to intake air (fresh air) of the intake pipe 31. The EGR rate and the ignition advance are controlled so that the operating point does not deviate from the region sandwiched between the knock limit curve and the misfire limit curve. As the EGR rate increases, the region sandwiched between the knock limit curve and the misfire limit curve becomes narrower, and the allowable error of the EGR control accuracy indicated by the one-dot chain line also decreases. Therefore, as the EGR rate increases, problems such as unstable combustion and misfire tend to occur, and high EGR control accuracy is required. That is, in particular, in the high EGR rate combustion system, it is required to maintain high EGR control accuracy and to prevent knocking or misfire of the internal combustion engine 1 due to the EGR control error.

[Functional Configuration of ECU]

Next, a functional configuration of the ECU 21 will be described with reference to FIG. 4.

Figure 4:
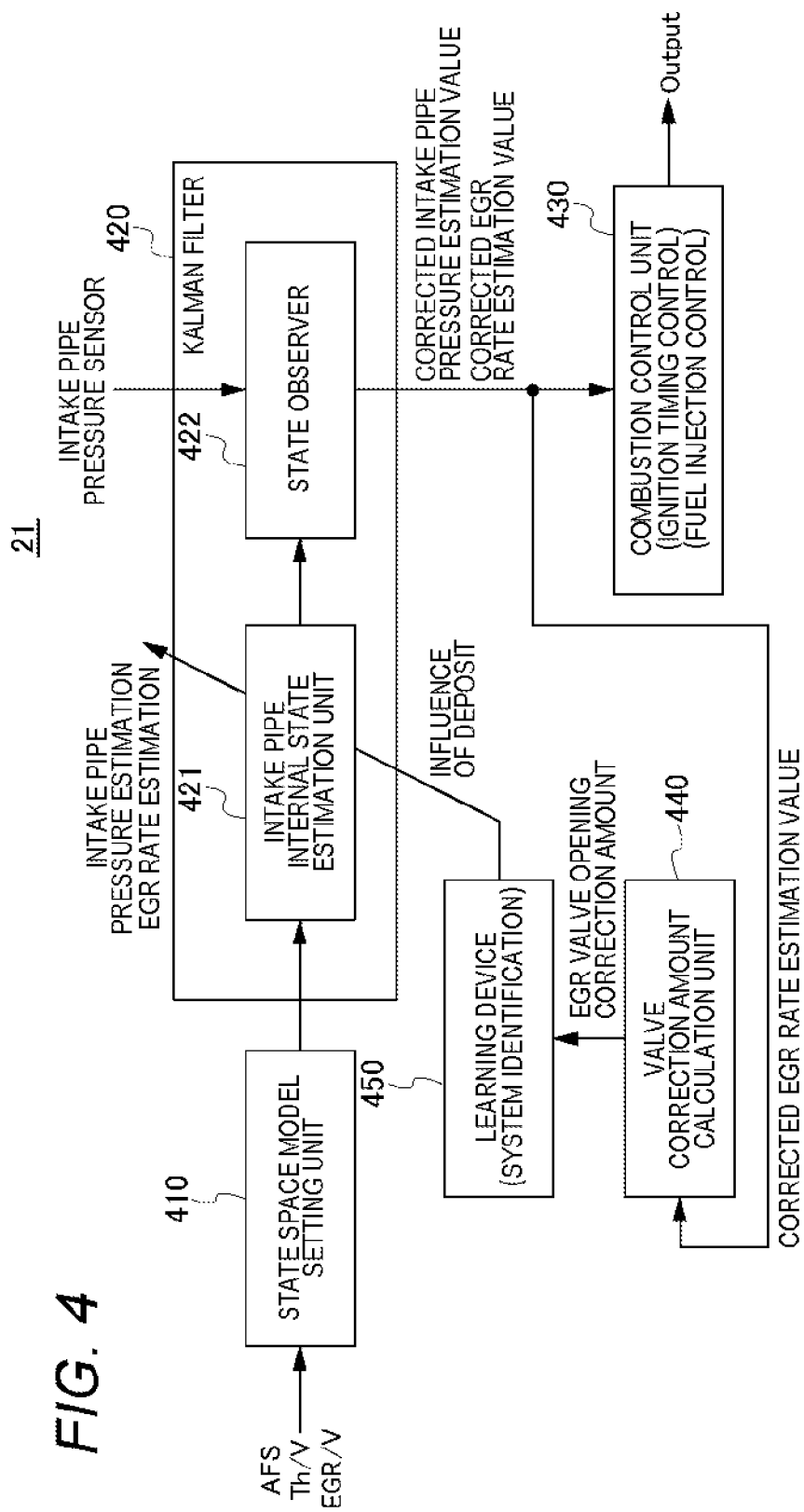
FIG. 4 is a block diagram illustrating a functional configuration example of an ECU.

FIG. 4 is a block diagram illustrating a functional configuration example of the ECU 21. The ECU 21 is configured to execute EGR valve control and EGR valve characteristic learning using a Kalman filter. This block diagram schematically illustrates a functional configuration of the ECU 21 according to the present embodiment.

The ECU 21 includes a state space model setting unit 410, a Kalman filter 420, a combustion control unit 430, a valve correction amount calculation unit 440, and a learning device (system identification) 450.

The state space model setting unit 410 sets a state space model representing an internal state of the intake pipe 31 on the basis of information such as a detection value (AFS) from the air flow sensor 3 that detects a flow rate of air taken into the intake pipe 31, a throttle valve opening (Th/V), and an EGR valve opening (EGR/V). Then, the state space model setting unit 410 outputs the setting contents of the state space model to the Kalman filter 420.

The Kalman filter 420 estimates the internal state (hereinafter, this state is referred to as an "intake pipe internal state") of the intake pipe 31 using the state space model set by the state space model setting unit 410, and further corrects (corrects) the estimated intake pipe internal state. The Kalman filter 420 includes an intake pipe internal state estimation unit 421 and a state observer 422. The intake pipe internal state estimation unit 421 and the state observer 422 are Kalman filters in a broad sense, and the state observer 422 has a correction function that is the essence of the Kalman filter.

The intake pipe internal state estimation unit 421 estimates the intake pipe internal state using the state space model set by the state space model setting unit 410, and outputs information on the estimated intake pipe internal state to the state observer 422. The state observer 422 corrects (corrects) the intake pipe internal state estimated by the intake pipe internal state estimation unit 421 based on the detection value from the intake pipe pressure sensor 6. The state observer 422 outputs the corrected intake pipe pressure estimation value and the corrected EGR rate estimation value as information on the intake pipe internal state.

The combustion control unit 430 executes ignition timing control and/or fuel injection control by using the information on the intake pipe internal state (the corrected intake pipe pressure estimation value and the corrected EGR rate estimation value) output from the state observer 422 of the Kalman filter 420.

Figure 8:
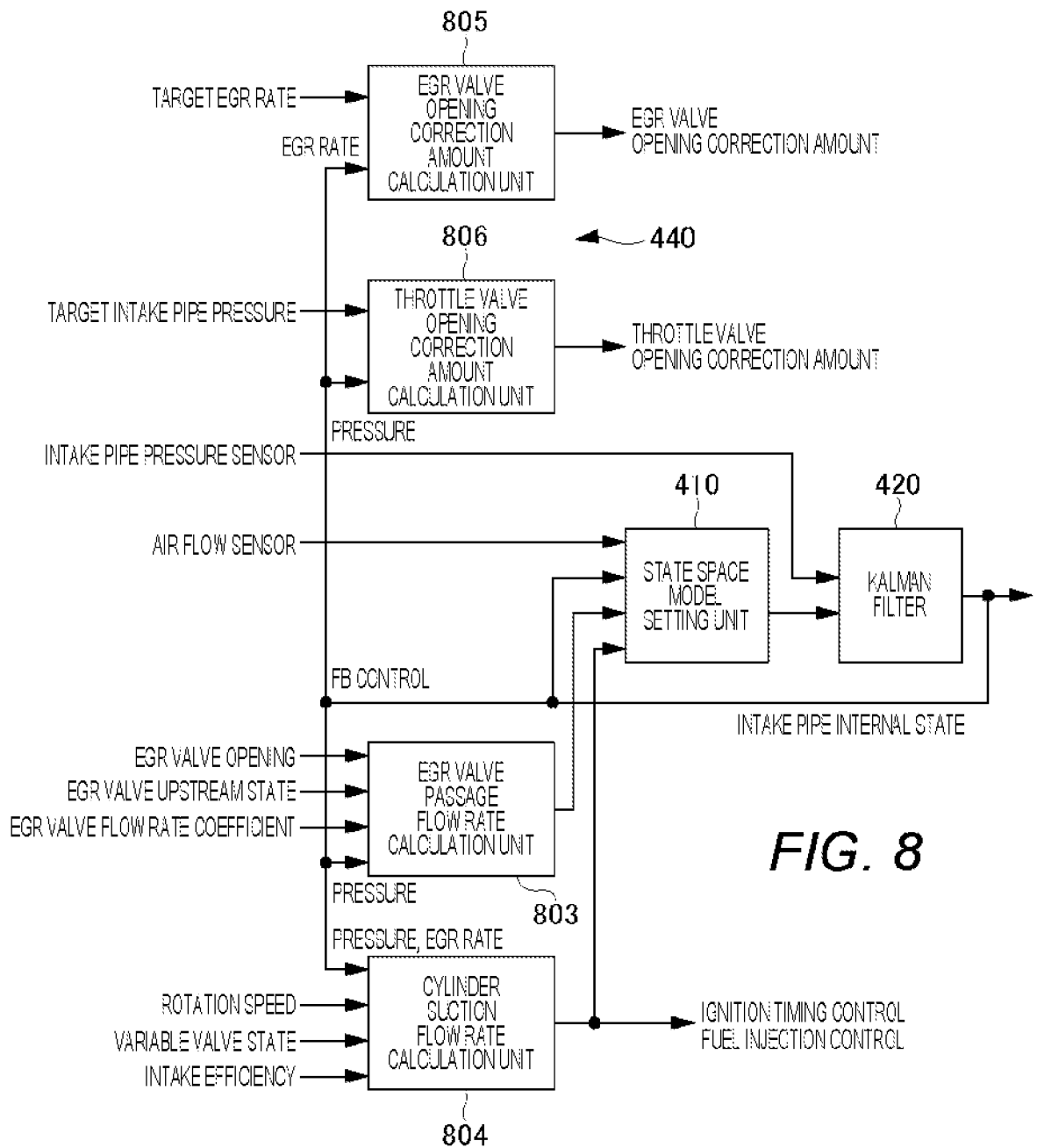
FIG. 8 is a diagram for explaining a control block that estimates an intake pipe internal state by a Kalman filter on the basis of information of an air flow sensor and an intake pipe pressure sensor, and executes correction of a throttle valve opening and an EGR valve opening on the basis of the estimated intake pipe internal state.

The valve correction amount calculation unit 440 calculates the valve correction amount (for example, the EGR valve opening correction amount) using the output (for example, the corrected EGR rate estimation value) of the state observer 422 of the Kalman filter 420, and outputs the calculation result to the learning device 450. In the present embodiment, as illustrated in FIG. 8, the valve correction amount calculation unit 440 includes an EGR valve opening correction amount calculation unit 805 and a throttle valve opening correction amount calculation unit 806.

Figure 12:
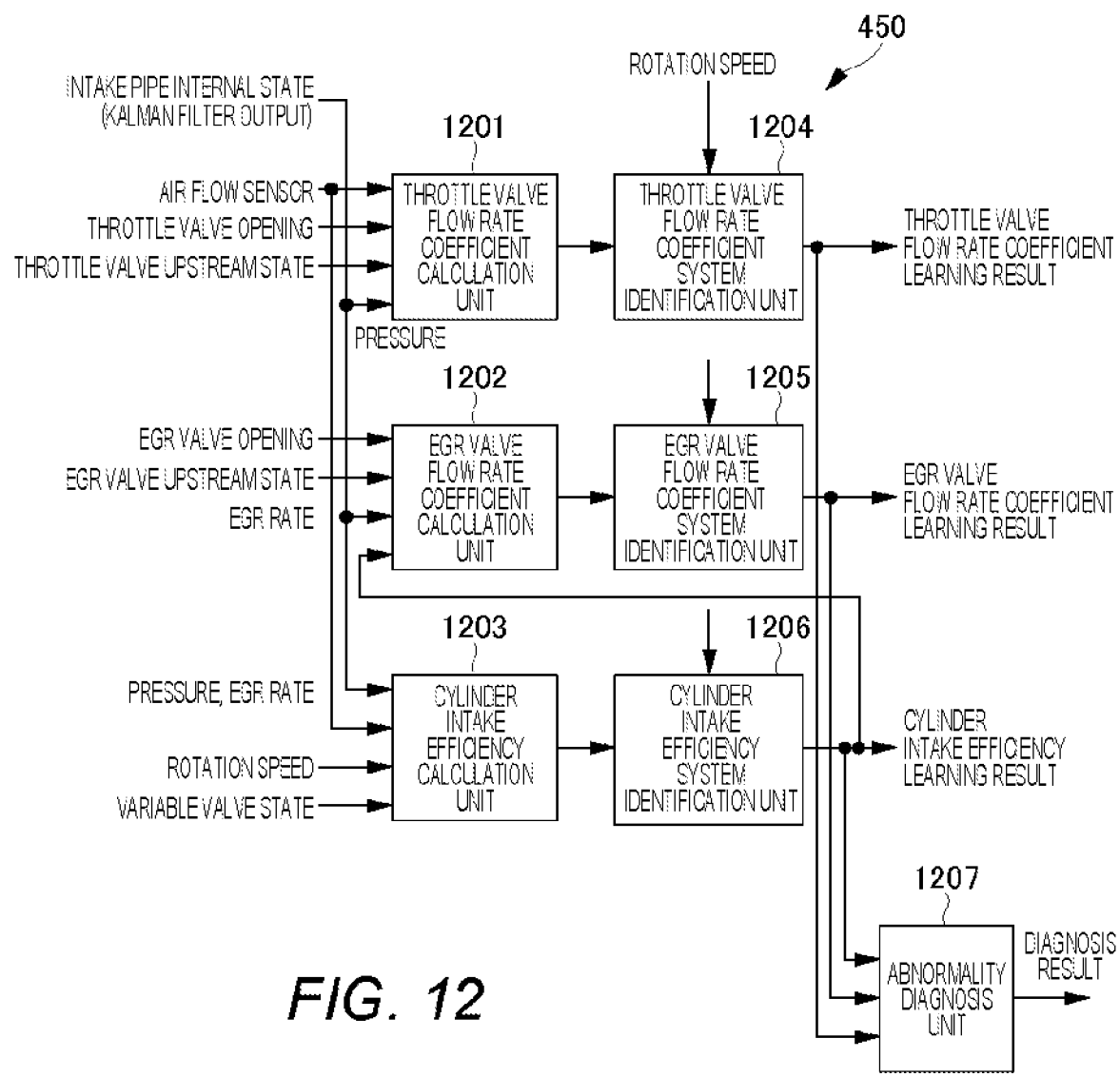
FIG. 12 is a diagram for explaining a control block that executes learning of a throttle valve flow rate coefficient, an EGR valve flow rate coefficient, and cylinder intake efficiency.

The learning device (system identification) 450 learns the valve characteristic of the control target using the output (for example, the EGR valve opening correction amount) of the valve correction amount calculation unit 440 and outputs the learning result to the intake pipe internal state estimation unit 421 of the Kalman filter 420. FIG. 4 illustrates an example in which the learning device 450 learns the EGR valve characteristic, but the valve to be learned is not limited to this example. In the present embodiment, as illustrated in FIG. 12, the learning device 450 includes a throttle valve flow rate coefficient system identification unit 1204, an EGR valve flow rate coefficient system identification unit 1205, and a cylinder intake efficiency system identification unit 1206.

[Control Block that Executes Opening Control of Throttle Valve and EGR Valve]

Next, opening control of the throttle valve and the EGR valve for realizing the target torque and the target EGR rate will be described with reference to FIG. 5.

Figure 5:
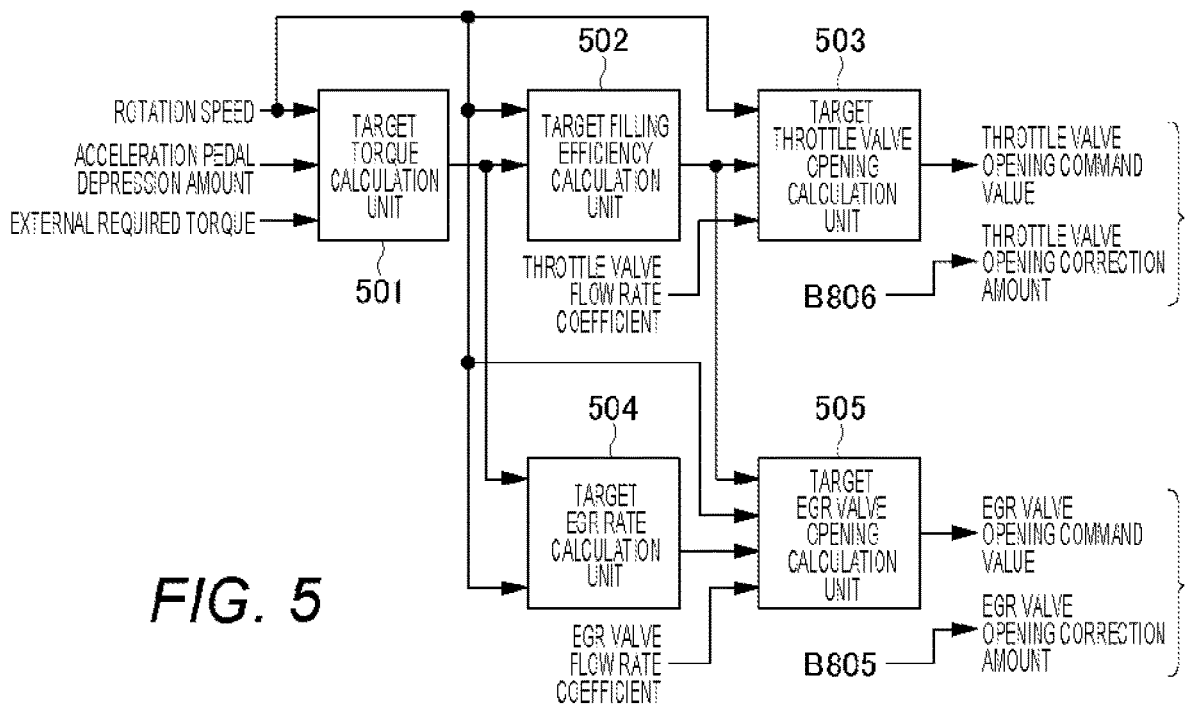
FIG. 5 is a diagram for explaining a control block that executes opening control of a throttle valve and an EGR valve that realize a target torque and a target EGR rate.

FIG. 5 illustrates a control block that executes opening control of the throttle valve and the EGR valve that realize the target torque and the target EGR rate.

The target torque calculation unit 501 calculates the target torque of the internal combustion engine 1 based on, for example, the rotation speed of the internal combustion engine 1, the accelerator pedal depression amount, and the external required torque. The external required torque is a torque that is not related to the driver's intention (for example, the accelerator pedal depression amount) considered in accordance with the vehicle interior air-conditioning state and the power generation state by the alternator.

The target filling efficiency calculation unit 502 calculates the target filling efficiency related to the intake air amount of the fresh air to the cylinder necessary for realizing the target torque in consideration of the current rotation speed and the target torque. The filling efficiency is a percentage of the intake air amount with respect to the cylinder volume.

The target throttle valve opening calculation unit 503 calculates a throttle valve opening command value for realizing the target intake air amount in consideration of the current rotation speed and the target filling efficiency. Here, a throttle valve flow rate coefficient learned by a throttle valve flow rate coefficient system identification unit 1204 (see FIG. 12) to be described later is considered for calculation of the throttle valve opening command value. The ECU 21 controls the throttle valve 4 based on the throttle valve opening command value and the throttle valve opening correction amount obtained by the throttle valve opening correction amount calculation unit 806 ("B806" in the drawing).

On the other hand, the target EGR rate calculation unit 504 calculates the target EGR rate based on the current rotation speed and the target torque. The exhaust gas recirculation (EGR) is performed for the purpose of reducing a pump loss due to an influence of a throttle valve throttling at a low/middle load, and for the purpose of reducing knocking at a high load.

The target EGR valve opening calculation unit 505 calculates a target EGR valve passage flow rate based on the current rotation speed, the target filling efficiency, and the target EGR rate, and further calculates a target EGR valve opening command value for realizing the target EGR valve passage flow rate. Here, an EGR valve flow rate coefficient learned by an EGR valve flow rate coefficient system identification unit 1205 (see FIG. 12) to be described later is considered for the calculation of the EGR valve opening command value. The ECU 21 controls the EGR valve 19 based on the EGR valve opening command value and the EGR valve opening correction amount obtained by the EGR valve opening correction amount calculation unit 805 ("B805" in the drawing).

[Physical Model to be Considered when Configuring Opening Control Model]

Figure 6:
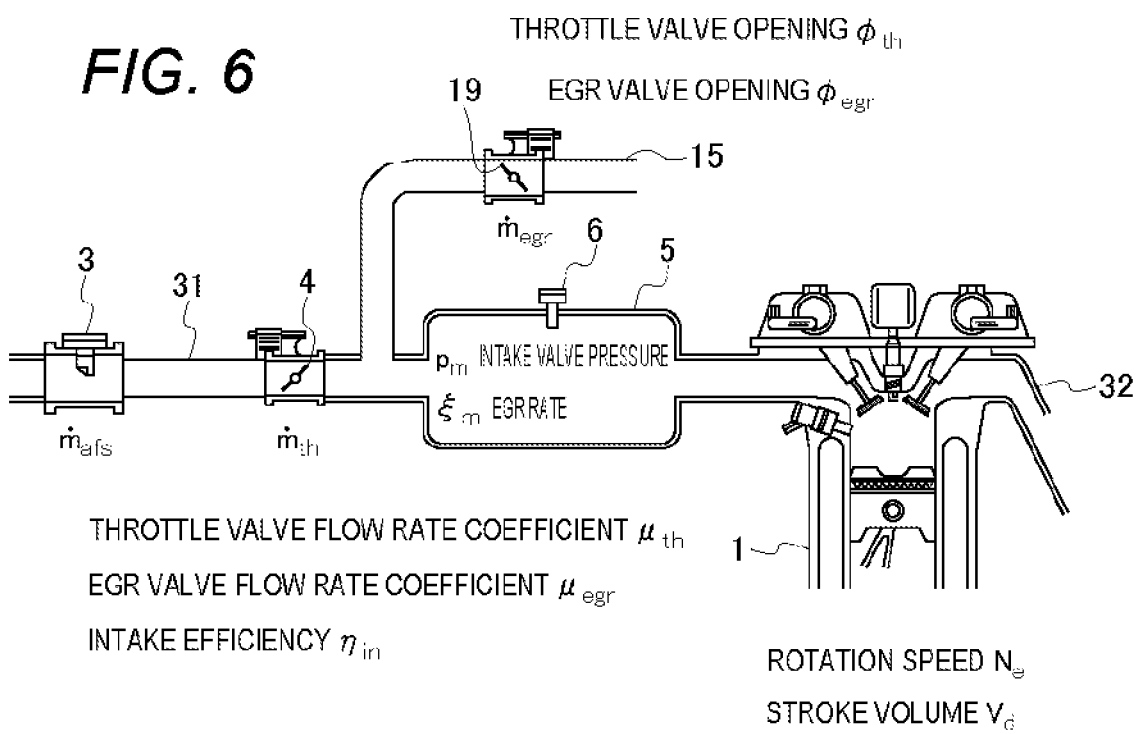
FIG. 6 is a diagram for explaining a physical model to be considered when an opening control model of a throttle valve and an EGR valve that realize a target torque and a target EGR rate is configured.

FIG. 6 is a diagram for explaining a physical model to be considered when an opening control model of the throttle valve and the EGR valve that realize the target torque and the target EGR rate is configured. As the state quantity in the intake pipe, the pressure (hereinafter, the pressure is referred to as "intake pipe pressure") $p_m$ in the intake pipe 31 (for example, the intake manifold 5) and the EGR rate $\xi_m$ in the intake pipe 31 are defined, and can be obtained by Formulas (1) and (2), respectively.

[Mathematical Formula 1]

$$\dot{p}_m = \frac{\kappa R}{V_m}(T_{atm}\dot{m}_{th} + T_{egr}\dot{m}_{egr} - T_m\dot{m}_{cyl}) \quad (1)$$

[Mathematical Formula 2]

$$\dot{\xi}_m = \frac{RT_m}{p_m V_m}(\dot{m}_{egr} - \xi_m \dot{m}_{cyl}) \quad (2)$$

Here, $m_{th}$ with a superscript dot symbol is a throttle valve passage flow rate, $m_{egr}$ with a superscript dot symbol is an EGR valve passage flow rate, $m_{cyl}$ with a superscript dot symbol is a cylinder suction flow rate, K is a polytropic index, R is a gas constant, $V_m$ is an intake manifold volume, $T_{atm}$ is an atmospheric temperature, $T_{egr}$ is an EGR temperature, and $T_m$ is an intake pipe temperature. The superscript dot symbol represents the first derivative with respect to time.

The throttle valve passage flow rate ($m_{th}$ with a superscript dot symbol) can be obtained by Formula (3). The throttle valve passage flow rate roughly corresponds to a detection value (mafs with a superscript dot symbol) from the air flow sensor 3.

[Mathematical Formula 3]

$$\dot{m}_{th} = \sqrt{2\rho_{atm}}\frac{\pi\mu_{th}D_{th}^2}{4}\left(1 - \frac{\cos(\phi_{th})}{\cos(\phi_{th0})}\right)\sqrt{p_{atm} - p_m} \quad (3)$$

Here, $\rho_{atm}$ is the atmospheric density, $\mu_{th}$ is the throttle valve flow rate coefficient, $D_{th}$ is the outer diameter of the throttle valve, $\varphi_{th}$ is the opening of the throttle valve, $\varphi_{th0}$ is the minimum opening of the throttle valve, and $p_{atm}$ is the atmospheric pressure.

The EGR valve passage flow rate ($m_{egr}$ with a superscript dot symbol) can be obtained by Formula (4).

[Mathematical Formula 4]

$$\dot{m}_{egr} = \sqrt{2\rho_e}\frac{\pi\mu_{egr}D_{egr}^2}{4}\left(1 - \frac{\cos(\phi_{egr})}{\cos(\phi_{egr0})}\right)\sqrt{p_e - p_m} \quad (4)$$

Here, $\rho_e$ is an EGR density (recirculated exhaust gas density), $\mu_{egr}$ is an EGR valve flow rate coefficient, $D_{egr}$ is an EGR valve outer diameter, $\varphi_{egr}$ is an EGR valve opening, and $\varphi_{egr0}$ is an EGR valve minimum opening. The cylinder suction flow rate ($m_{cyl}$ with a superscript dot symbol) is obtained by Formula (5).

[Mathematical Formula 5]

$$\dot{m}_{cyl} = \frac{N_e}{120}\eta_{in}\frac{V_d p_m}{RT_m} \quad (5)$$

Here, $N_e$ is the rotation speed (the number of revolutions per minute) of the internal combustion engine 1, $\eta_{in}$ is the intake efficiency, and $V_d$ is the total stroke volume of the internal combustion engine 1. The intake efficiency is a value indicating a ratio of a mass of gas actually sucked into the cylinder with a mass of gas in the intake manifold corresponding to a stroke volume of all cylinders (for example, four cylinders) as a reference (1.0).

Filling efficiency $\eta_{ch}$ of fresh air sucked into the cylinder is defined by Formula (6).

[Mathematical Formula 6]

$$\eta_{ch} = \eta_{in}\frac{p_m T_0}{p_0 T_m}(1 - \xi_m) \quad (6)$$

Here, $p_0$ and $T_0$ are a temperature and a pressure (for example, 25° C., 101.325 kPa) in a standard state of the atmosphere.

The net average effective pressure, which is an index of the torque, is obtained by Formula (7).

[Mathematical Formula 7]

$$p_{me} = \frac{H_L \eta_{in} \eta_{ite}}{RT_m} \frac{\varphi}{L_0} p_m(1-\xi_m) - p_f \quad (7)$$

Here, $H_L$ is a lower calorific value of the fuel, $\eta_{ite}$ is the illustrated thermal efficiency, $\varphi$ is the equivalent ratio, $L_0$ is the theoretical air-fuel ratio, and $p_f$ is the friction average effective pressure regarding the friction torque. The friction torque is a torque that acts to inhibit movement between objects in contact by friction.

[Target Valve Opening Calculation Based on Valve Passing Flow Rate Calculation Model]

Here, the target valve opening calculation based on the valve passage flow rate calculation model will be described with reference to FIG. 7.

Figure 7:
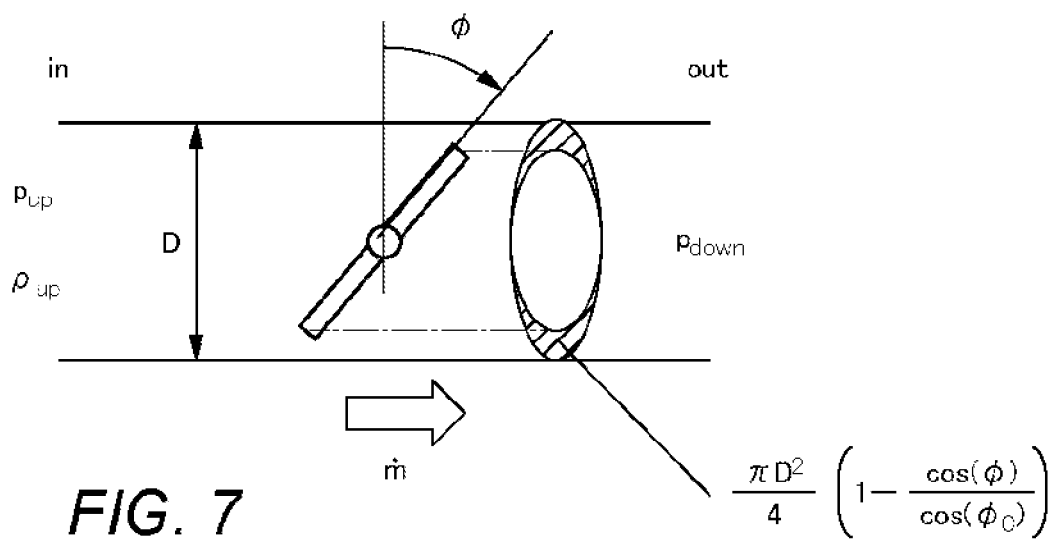
FIG. 7 is a diagram for explaining a method of calculating a target valve opening based on a valve passage flow rate calculation model using a schematic valve cross-sectional view.

FIG. 7 is a diagram for explaining a method of calculating a target valve opening based on a valve passage flow rate calculation model using a schematic valve cross-sectional view. In the figure, m with a superscript dot is the valve passage flow rate, $p_{up}$ is the pressure of the gas on the upstream side (in) of the valve, $p_{down}$ is the pressure of the gas on the downstream side (out) of the valve, p up is the density of the gas on the upstream side of the valve, D is the outer diameter of the valve, and p is the opening of the valve. The hatched portion represents a flow path of gas passing through the valve. The cross-sectional area of the flow path, that is, the opening area S is expressed by Formula (8).

[Mathematical Formula 8]

$$S = \frac{\pi D^2}{4}\left(1 - \frac{\cos(\phi)}{\cos(\phi_0)}\right) \quad (8)$$

When the valve is a throttle valve, $p_{up}$ in FIG. 7 corresponds to the atmospheric pressure $p_{atm}$, $p_{down}$ corresponds to the intake pipe pressure $p_m$, $p_{up}$ corresponds to the atmospheric density $\rho_{atm}$, and D corresponds to the throttle valve outer diameter $D_{th}$. The throttle valve opening $\varphi_{th}$ for realizing the target air amount ($m_{th,d}$ with a superscript dot) defined by the target torque and the rotation speed by modifying the throttle valve passage flow rate expression of Formula (3) is obtained by inversely calculating the throttle valve passage flow rate expression as in Formula (9).

[Mathematical Formula 9]

$$\dot{m}_{th} = \sqrt{2\rho_{atm}} \frac{\pi \mu_{th} D_{th}^2}{4}\left(1 - \frac{\cos(\phi_{th})}{\cos(\phi_{th0})}\right)\sqrt{p_{atm} - p_m} \Rightarrow \left(1 - \frac{\cos(\phi_{th})}{\cos(\phi_{th0})}\right) = \quad (9)$$

$$\frac{\dot{m}_{th,d}}{\sqrt{2\rho_a} \frac{\pi \mu_{th} D_{th}^2}{4} \sqrt{p_{atm} - p_m}} \Rightarrow \phi_{th}$$

Formula (9) can be replaced with table calculation of the throttle valve opening and the opening area and used for calculation of the target throttle valve opening by the target throttle valve opening calculation unit 503 of FIG. 5.

Similarly, when the valve is an EGR valve, $p_{up}$ in FIG. 7 corresponds to the EGR valve upstream pressure $p_{egr}$, $p_{down}$ corresponds to the intake pipe pressure $p_m$, $p_{up}$ corresponds to the EGR density $\rho_{egr}$, and D corresponds to the EGR valve outer diameter $D_{egr}$. The EGR valve passage flow rate expression of Formula (4) is modified, and the EGR valve opening $\varphi_{egr}$ for realizing the target EGR flow rate ($m_{egr,d}$ with a superscript dot symbol) defined by the target torque and the rotation speed is obtained by inversely calculating the EGR valve passage flow rate expression as in Formula (10).

[Mathematical Formula 10]

$$\dot{m}_{egr}\sqrt{2\rho_{egr}}\frac{\pi\mu_{egr}D_{egr}^2}{4}\left(1 - \frac{\cos(\phi_{egr})}{\cos(\phi_{egr0})}\right)\sqrt{p_{egr} - p_m} \Rightarrow \quad (10)$$

$$\left(1 - \frac{\cos(\phi_{egr})}{\cos(\phi_{egr0})}\right) = \frac{\dot{m}_{egr,d}}{\sqrt{2\rho_{egr}}\frac{\pi\mu_{egr}D_{egr}^2}{4}\sqrt{p_{egr} - p_m}} \Rightarrow \phi_{egr}$$

Formula (10) can be replaced with table calculation of the EGR valve opening and the opening area, and can be used for calculation of the target EGR valve opening by the target EGR rate calculation unit 504 of FIG. 5.

[Correction of Throttle Valve Opening and EGR Valve Opening]

FIG. 8 illustrates a control block in which an intake pipe internal state is estimated by the Kalman filter 420 based on output information of the air flow sensor 3 and the intake pipe pressure sensor 6, and a throttle valve opening and an EGR valve opening are corrected based on the estimated intake pipe internal state.

In the state space model setting unit 410, the intake pipe internal states defined by Formulas (1) and (2) are described by a state space model (Formulas (12) and (13)) to be described later, and a matrix, a state vector, an input vector, and an output vector (Formulas (14) to (16)) are defined on the basis of the input information. In the present embodiment, the detection value from the air flow sensor 3, the calculation result from the EGR valve passage flow rate calculation unit 803, the calculation result from the cylinder suction flow rate calculation unit 804, and the intake pipe internal state output from the Kalman filter 420 are input to the state space model setting unit 410. The state space model setting unit 410 redefines each element of the state space model for each step in discrete time.

In the Kalman filter 420, on the premise of the matrix, the state vector, the input vector, and the output vector defined by the state space model setting unit 410, the state vector representing the intake pipe internal state is updated (corrected) according to a Kalman filter algorithm (see FIG. 11) to be described later based on the detection value from the intake pipe pressure sensor 6. Here, the state vector is a vector including the intake pipe pressure (Formula (1)) and the intake pipe EGR rate (Formula (2)). That is, the Kalman filter 420 outputs the updated (corrected) intake pipe pressure estimation value and the EGR rate estimation value as the intake pipe internal state. Unless otherwise specified in the present specification, the EGR rate refers to an intake pipe EGR rate.

The EGR valve passage flow rate calculation unit 803 calculates the EGR valve passage flow rate based on the intake pipe pressure estimation value updated by the Kalman filter 420, the EGR valve opening, the EGR valve upstream state, and the EGR valve flow rate coefficient. Here, the EGR valve upstream state is a detection value from the EGR valve upstream temperature sensor 17 upstream of the EGR valve 19 and a detection value from the EGR valve upstream pressure sensor 18. As described above, by using the intake pipe pressure estimation value updated by the Kalman filter 420, the EGR valve passage flow rate can be accurately estimated in consideration of the actual measurement value of the intake pipe pressure.

The cylinder suction flow rate calculation unit 804 calculates the cylinder suction flow rate based on the intake pipe pressure estimation value and the EGR rate estimation value updated by the Kalman filter 420, the rotation speed, the variable valve state, and the intake efficiency. The cylinder suction flow rate is a flow rate of intake air flowing from the intake manifold 5 to the cylinder. Here, the variable valve state is a detection value (phase) from the intake valve position sensor 9 and the exhaust valve position sensor 11. As described above, by using the intake pipe pressure estimation value and the EGR rate estimation value updated by the Kalman filter 420, the cylinder intake flow rate, the fresh air filling efficiency, and the cylinder EGR rate can be accurately estimated in consideration of the actual measurement value of the intake pipe pressure. The cylinder EGR rate is a ratio of fresh air and exhaust air in the cylinder. By using these pieces of information for the ignition timing control and the fuel injection control in the combustion control unit 430 (FIG. 4), the ignition timing control and the fuel injection control can be performed with high accuracy and robustness by appropriately reflecting the current state.

The EGR valve opening correction amount calculation unit 805 calculates the EGR valve opening correction amount from the difference between the EGR rate estimation value updated by the Kalman filter 420 and the target EGR rate using Formula (28) to be described later (Formula (28) to be described later). By calculating the EGR valve opening correction amount using the EGR rate estimation value updated by the Kalman filter 420, the EGR rate can be accurately controlled in consideration of the actual measurement value of the intake pipe pressure.

The throttle valve opening correction amount calculation unit 806 calculates the throttle valve opening correction amount from the difference between the intake pipe pressure estimation value updated by the Kalman filter 420 and the target intake pipe pressure defined by the target torque and the target EGR rate using Formula (27) to be described later. By calculating the throttle valve opening correction amount using the intake pipe pressure estimation value updated by the Kalman filter 420, the torque can be accurately controlled in consideration of the actual measurement value of the intake pipe pressure.

It is also possible to calculate a target filling efficiency correction amount from a difference between the fresh air filling efficiency (Formula (6)) in which the corrected EGR rate estimation value is taken into consideration and the target filling efficiency output by the target filling efficiency calculation unit 502 and to obtain the throttle valve opening correction amount based on the target filling efficiency correction amount.

[Control Model]

Next, functions used in constructing a control model that realizes internal state feedback control will be described.

FIG. 9 is a conceptual diagram illustrating functions used in constructing the control model in a block diagram. An estimator 910 obtains the output variable based on the input variable, the internal state variable and model constant, and the static characteristic and the dynamic characteristic defined by the model constant. As a result, it is possible to estimate the output behavior and the behavior of the internal state with respect to the input.

Although the estimator 910 describes the control target as a forward problem, it is necessary to solve an inverse problem in the control model. That is, a controller inputs an output variable as a target value and outputs an input variable (control amount) for realizing the target value. In deriving this controller, the following several functional blocks are defined.

First, the input/output relationship of the estimator 910 is changed to construct an observer 920. The observer 920 can be constructed by setting the input variable, the output variable, and the model constant to the block input and outputting the state variable. One of the methods for realizing the observer 920 is a Kalman filter adopted in the present embodiment.

Furthermore, a learning device 930 can be constructed by changing the input/output relationship of the estimator 910. The learning device 930 sets an input variable and an output variable as teacher data to a block input and outputs a model constant. In the present embodiment, the learning device 930 (system identification) is realized using a sequential least squares algorithm.

[State Space Model of Intake Pipe Internal State]

Next, a method of describing an intake pipe internal state by a state space model will be described. A discrete expression of the time derivative of the state variable is defined as Formula (11) according to the forward difference of the first order of Euler.

[Mathematical Formula 11]

$$\dot{x} \equiv \frac{dx}{dt} \cong \frac{x^{k+1} - x^k}{\Delta t} \tag{11}$$

Here, a subscript k added to the upper right of x represents a current value when discretized on the time axis. Here, the forward difference of the primary accuracy is used, but the present invention is not limited thereto. Formulas (1) and (2) are discretized according to Formula (11), and are described by state space models of Formulas (12) and (13).

[Mathematical Formula 12]

$$x^{k+1} = Ax^k + Bu^k \tag{12}$$

[Mathematical Formula 13]

$$y^k = Cx^k \tag{13}$$

Here, in Formulas (12) and (13), A, B, and C indicated by alphabets are matrices, respectively. $x^k$ denotes a state vector, $u^k$ denotes an input vector, and $y^k$ denotes an output vector, which are given by Formulas (14), (15), and (16), respectively.

[Mathematical Formula 14]

$$x^k = \begin{bmatrix} p_m^k \\ \xi_m^k \end{bmatrix} \tag{14}$$

[Mathematical Formula 15]

$$u^k = \begin{bmatrix} \dot{m}_{th}^k \\ \dot{m}_{egr}^k \end{bmatrix} \tag{15}$$

[Mathematical Formula 16]

$$y^k = [p_m^k] \tag{16}$$

The matrices A, B, and C are given by Formulas (17), (18), and (19), respectively.

[Mathematical Formula 17]

$$A = \begin{bmatrix} 1 - \frac{\Delta t}{y_m} \frac{N_e}{120} \eta_{in} V_d & 0 \\ 0 & 1 - \frac{\Delta t}{y_m} \frac{N_e}{120} \eta_{in} V_d \end{bmatrix} \quad (17)$$

[Mathematical Formula 18]

$$B = \begin{bmatrix} \frac{\Delta t R T_a}{V_m} & \frac{\Delta t R T_{egr}}{V_m} \\ 0 & \frac{\Delta t R T_m}{p_m V_m} \end{bmatrix} \quad (18)$$

[Mathematical Formula 19]

$$C = \begin{bmatrix} 1 & 0 \\ 0 & 0 \end{bmatrix} \quad (19)$$

The state space model setting unit 410 in FIG. 8 organizes the state equations by the state space model, and passes the matrices and vectors defined by Formulas (14) to (16) and Formulas (17) to (19) to the Kalman filter processing executed in the Kalman filter 420.

[Internal Configuration of Kalman Filter and Kalman Filter Algorithm]

Next, the internal configuration of the Kalman filter 420 and the Kalman filter algorithm will be described with reference to FIGS. 10 and 11.

Figure 10:
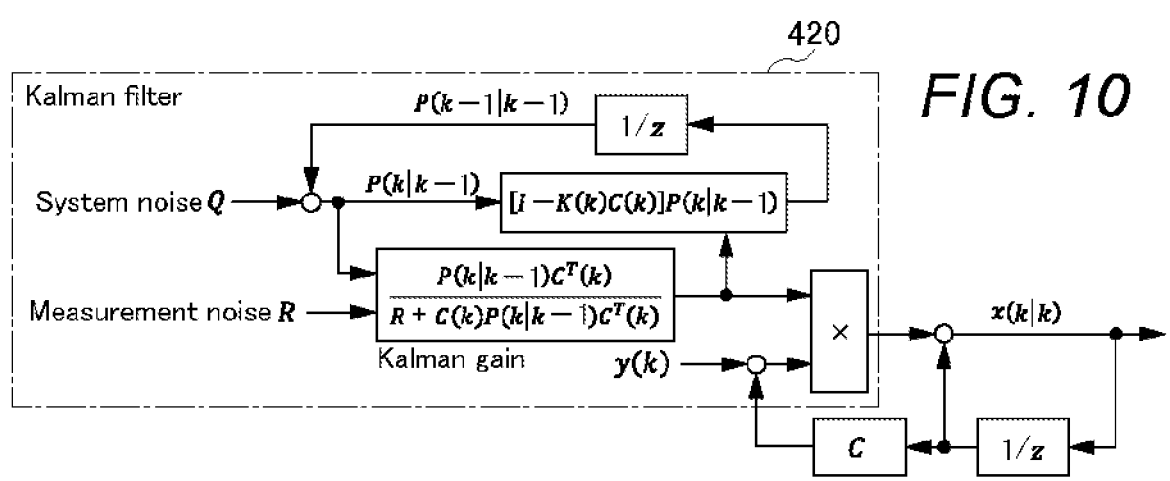
FIG. 10 is a block diagram showing an internal configuration example of a Kalman filter.

FIG. 10 is a block diagram illustrating an internal configuration example of the Kalman filter 420. FIG. 11 is a flowchart illustrating an example of a Kalman filter algorithm executed by the Kalman filter 420.

The system of the present embodiment employs a linear Kalman filter algorithm, but the present invention is not limited thereto. That is, even when an extended Kalman filter known as a nonlinear Kalman filter, an ensemble Kalman filter, or the like is applied, a similar effect is obtained. Hereinafter, the Kalman filter 420, which is one of the components of the throttle valve control and the EGR valve control, will be described as an algorithm and an application method to this control.

The Kalman filter 420 describes an intake pipe internal state to be controlled by a state equation, and defines sensor measurement information in an output variable of the state equation. Then, based on the sensor measurement information defined in the output variable, a state variable (hereinafter referred to as "internal state variable") representing the intake pipe internal state that cannot be directly measured is estimated.

When the Kalman filter 420 is executed, the control unit 23 of the ECU 21 determines whether or not the Kalman filter 420 can be executed (S1101). The sensor state and the prediction range of the underlying state equation are considered as the determination index of the feasibility of execution. For example, when it is determined by diagnosis that the sensor output cannot be obtained due to a failure or disconnection of the sensor, or that the sensor is deteriorated and an unallowable error occurs in the sensor output as the sensor state, the Kalman filter 420 is not executed because accurate filter processing cannot be performed. Here, the state quantities targeted in the state equation are the intake pipe pressure and the intake pipe EGR rate. In a case where any of the variables of the state equation exceeds the prediction range (theoretical/physical range that can be taken by the state equation), that is, in a region that cannot be covered by the state equation, the Kalman filter 420 is not executed because accurate filter processing cannot be performed.

When detecting these situations, the control unit 23 determines that the Kalman filter 420 cannot be executed (NO in S1101) and terminates the processing of this flowchart, and when determining that the Kalman filter 420 can be executed (YES in S1101), the control unit proceeds to step S1102. Note that the control unit 23 may set a fail-safe process flag for the engine system when determining that the Kalman filter 420 cannot be executed.

Hereinafter, calculation formulas executed in steps S1102 to S1106 are specifically shown. The Kalman filter 420 is based on a state equation including the system noise Q and the observation noise R defined by Formulas (20) and (21).

[Mathematical Formula 20]

$$x(k+1) = Ax(k) + Bu(k) + Q \quad (20)$$

[Mathematical Formula 21]

$$y(k) = Cx(k) + R \quad (21)$$

Here, "k" means a current value of the discrete time. The processing of the Kalman filter 420 is divided into a prediction step and a filtering step. In the prediction step, the intake pipe internal state estimation unit 421 (FIG. 4) in the Kalman filter 420 calculates (updates) the internal state variable vector x and the covariance matrix P by Formulas (22) and (23) based on the input variables and the system noise Q (S1102, S1103).

[Mathematical Formula 22]

$$X(k|k-1) = Ax(k-1|k-1) + Bu(k) \quad (22)$$

[Mathematical Formula 23]

$$P(k|k-1) = AP(k-1|k-1)A^T + Q \quad (23)$$

Next, in the filtering step, the state observer 422 (FIG. 4) calculates a Kalman gain K defined by the updated covariance matrix P and the observation noise R by Formula (24) (S1104). Note that the state observer 422 may be configured to calculate the covariance matrix P in step S1103.

[Mathematical Formula 24]

$$K(k) = \frac{P(k|k-1)C^T(k)}{R + C(k)P(k|k-1)C^T(k)} \quad (24)$$

Further, the state observer 422 updates the internal state variable vector x and the covariance matrix P again by the following Formulas (25) and (26) using the Kalman gain K and the observation data (detection value from the intake pipe pressure sensor 6) (S1105, S1106). An alphabet "I" in Formula (26) is a unit matrix. After the processing of steps 1105 and S1106 is completed, the procedure of the processing returns to step S1101. In this manner, the internal state variable vector x and the covariance matrix P are corrected by the actual observation data y(k) (detection value from the intake pipe pressure sensor 6).

[Mathematical Formula 25]

$$x(k|k) = x(k|k-1) + K(k)(y(k) - C(k)x(k|k-1)) \quad (25)$$

[Mathematical Formula 26]

$$P(k|k) = [I - K(k)C(k)]P(k|k-1) \quad (26)$$

From the above calculation, the behavior of the EGR rate, which is one of the internal state variables x(k|k) that are difficult to directly measure, can be estimated based on the output information of the measurable intake pipe pressure sensor 6. In the present embodiment, information of the intake pipe internal state (intake pipe pressure and EGR rate) output from the Kalman filter 420 is used as teacher data for internal state feedback control and system identification (learning).

[Internal State Feedback Control]

Next, an internal state feedback control method executed in the calculation of the throttle valve opening correction amount of the throttle valve opening correction amount calculation unit 806 and the EGR valve opening correction amount of the EGR valve opening correction amount calculation unit 805 illustrated in FIG. 8 will be described. For the internal state feedback control, PID control including a proportional term, an integral term, and a derivative term is used, but the present invention is not limited to this example.

(Calculation of Throttle Valve Opening Correction Amount)

The throttle valve opening correction amount calculation unit 806 calculates a throttle valve opening correction amount $\delta\varphi_{th}$ based on Formula (27) from a difference between the intake pipe pressure estimation value corrected (updated) by the state observer 422 of the Kalman filter 420 and the target intake pipe pressure defined by the target torque and the target EGR rate.

[Mathematical Formula 27]

$$\delta\phi_{th} C_{P,t}(p_{m,d} - p_m) + \\ C_{I,t} \int (p_{m,d} - p_m)dt + C_{D,t}\frac{d}{dt}(p_{m,d} - p_m)\phi_{th} \leftarrow \phi_{th} + \delta\phi_{th} \quad (27)$$

Here, $C_{P,t}$, $C_{I,t}$, and $C_{D,t}$ are PID control parameters. As also illustrated in FIG. 5, the control unit 23 controls the throttle valve opening by adding the throttle valve opening correction amount to the throttle valve opening command value. By obtaining the throttle valve opening correction amount using the intake pipe pressure (estimation value) updated by the Kalman filter 420, the torque can be accurately controlled in consideration of the actual measurement value of the intake pipe pressure.

(EGR Valve Opening Correction Amount Calculation)

The EGR valve opening correction amount calculation unit 805 calculates an EGR valve opening correction amount $\delta\varphi_{egr}$ by Formula (28) from a difference between the EGR rate estimation value corrected (updated) by the state observer 422 of the Kalman filter 420 and the target EGR rate.

[Mathematical Formula 28]

$$\delta\phi_{egr} C_{P,e}(\xi_{m,d} - \xi_m) + C_{I,e} \int (\xi_{m,d} - \xi_m)dt + C_{D,e}\frac{d}{dt}(\xi_{m,d} - \xi_m)\phi_{egr} \leftarrow \\ \phi_{egr} + \delta\phi_{egr} \quad (28)$$

Here, $C_{p,e}$, $C_{I,e}$, and $C_{D,e}$, are PID control parameters. As also illustrated in FIG. 5, the control unit 23 controls the EGR valve opening by adding the EGR valve opening correction amount to the EGR valve opening command value. By obtaining the EGR valve opening correction amount using the EGR rate (estimation value) updated by the Kalman filter 420, the EGR rate can be accurately controlled in consideration of the actual measurement value of the intake pipe pressure. Note that, although PID control is used here, the present invention is not limited thereto, and a similar effect is also obtained in the case of control by any one of a proportional term, an integral term, and a derivative term, or control in which two terms are combined.

[Learning of Throttle Valve Flow Rate Coefficient, EGR Valve Flow Rate Coefficient, and Cylinder Intake Efficiency]

FIG. 12 illustrates a control block that executes learning of a throttle valve flow rate coefficient, an EGR valve flow rate coefficient, and cylinder intake efficiency.

The throttle valve flow rate coefficient calculation unit 1201 calculates a throttle valve flow rate coefficient based on a detection value from the air flow sensor 3, a throttle valve opening, a throttle valve upstream state, and an intake pipe pressure estimation value which is an output of the Kalman filter 420. The throttle valve flow rate coefficient is input to the throttle valve flow rate coefficient system identification unit 1204. Here, the throttle valve upstream state is the temperature and pressure of intake air, that is, the atmosphere on the upstream side of the throttle valve 4. In FIG. 1, a temperature sensor and a pressure sensor that measure the upstream state of the throttle valve are omitted.

The EGR valve flow rate coefficient calculation unit 1202 calculates the EGR valve flow rate coefficient based on the EGR valve opening, the EGR valve upstream state, the EGR rate estimation value that is the output of the Kalman filter 420, and the cylinder intake efficiency obtained by the cylinder intake efficiency calculation unit 1203. The EGR valve flow rate coefficient is input to an EGR valve flow rate coefficient system identification unit 1205. Here, the EGR valve passage flow rate is obtained based on the cylinder intake efficiency, the rotation speed, and the EGR rate estimation value, and the EGR valve flow rate coefficient is obtained from the EGR valve passage flow rate, the EGR valve opening, and the EGR valve upstream state.

The EGR valve flow rate coefficient calculation unit 1202 uses the learning result of the cylinder intake efficiency from the cylinder intake efficiency system identification unit 1206. The air flow sensor 3 detects a flow rate of intake air of the intake pipe 31, and a detection value thereof is affected by the throttle valve 4. Therefore, as the state on the downstream side of the throttle valve 4, the learning result of the cylinder intake efficiency output by the cylinder intake efficiency system identification unit 1206 has higher reliability than the detection value from the air flow sensor 3. Therefore, the learning efficiency of the EGR valve flow rate coefficient is improved by using the learning result of the cylinder intake efficiency output by the cylinder intake efficiency system identification unit 1206 for the calculation of the EGR valve flow rate coefficient. Of course, the EGR valve flow rate coefficient can be calculated using the detection value from the air flow sensor 3.

The cylinder intake efficiency calculation unit 1203 calculates the cylinder intake efficiency based on the intake pipe pressure estimation value and the EGR rate estimation value which are the output of the Kalman filter 420, the detection value from the air flow sensor 3, the rotation speed, and the variable valve state. The cylinder intake efficiency is input to the cylinder intake efficiency system identification unit 1206. The detection value from the air flow sensor 3 is a value output by the air flow sensor 3 in a state (steady state) where the exhaust gas of the EGR pipe 15 is not returned to the intake pipe 31.

The throttle valve flow rate coefficient system identification unit 1204, the EGR valve flow rate coefficient system identification unit 1205, and the cylinder intake efficiency system identification unit 1206 each correspond to the learning device 450.

The throttle valve flow rate coefficient system identification unit 1204 sequentially learns the throttle valve flow rate coefficient obtained by the throttle valve flow rate coefficient calculation unit 1201 on the basis of a system identification algorithm (see FIG. 17) to be described later on the basis of the current rotation speed. That is, the throttle valve flow rate coefficient system identification unit 1204 (learning unit) is configured to learn the relationship among the throttle valve flow rate coefficient obtained based on the intake pipe pressure estimation value corrected by the state observer 422 (estimation value correction unit) of the Kalman filter 420, the detection value from the air flow sensor 3, and the throttle valve opening.

In addition, the EGR valve flow rate coefficient system identification unit 1205 sequentially learns the EGR valve flow rate coefficient obtained by the EGR valve flow rate coefficient calculation unit 1202 on the basis of a system identification algorithm to be described later on the basis of the current rotation speed. That is, the EGR valve flow rate coefficient system identification unit 1205 (learning unit) is configured to learn the relationship between the EGR valve flow rate coefficient obtained based on the EGR rate estimation value corrected by the state observer 422 (estimation value correction unit) of the Kalman filter 420 and the EGR valve opening.

In addition, the cylinder intake efficiency system identification unit 1206 sequentially learns the cylinder intake efficiency obtained by the cylinder intake efficiency calculation unit 1203 based on a system identification algorithm to be described later on the basis of the current rotation speed. That is, the cylinder intake efficiency system identification unit 1206 (learning unit) is configured to learn the relationship among the cylinder intake efficiency, the rotation speed, and the variable valve state, which are obtained based on the intake pipe pressure estimation value and the EGR rate estimation value corrected by the state observer 422 (estimation value correction unit) of the Kalman filter 420, and the rotation speed.

A learning result (model constant) of the throttle valve flow rate coefficient, a learning result (model constant) of the EGR valve flow rate coefficient, and a learning result (model constant) of the cylinder intake efficiency are input to the Kalman filter 420 (FIG. 4). Then, the model constant (adjustment parameter) of the state space model used in the intake pipe internal state estimation unit 421 of the Kalman filter 420 is updated. The model constant is, for example, a partial regression coefficient of a polynomial obtained by a sequential least squares algorithm.

With such a configuration, it is possible to sequentially learn the influence of the temporal change of the flow rate characteristic due to the deposit adhesion of the throttle valve 4 and the EGR valve 19, the opening and closing phase variation due to the intake valve chain elongation, and the like, and appropriately reflect the influence of the temporal change in the internal state feedback control. The deposit is an oxide or a carbide which is a combustion product of fuel and oil deposited on a combustion chamber wall surface, a valve inner surface, or the like. In the present specification, the deposit is abbreviated as "deposit".

The abnormality diagnosis unit 1207 diagnoses normality/abnormality based on the learning results of the throttle valve flow rate coefficient, the EGR valve flow rate coefficient, and the cylinder intake efficiency. When each learned value exceeds a threshold for determining an abnormal state, the abnormality diagnosis unit 1207 determines the state as an abnormal state, notifies the outside by turning on the warning display lamp 22, and stores the abnormal value in the memory (storage unit 24) of the ECU 21.

The presence or absence of abnormality of the throttle valve 4 can be diagnosed by comparing the throttle valve flow rate coefficient with the threshold. For example, it is determined whether or not the relationship among the corrected intake pipe pressure (the intake pipe pressure estimation value output by the Kalman filter 420), the actual measurement value of the air flow sensor 3, and the throttle valve opening deviates from the relationship assumed in advance (whether or not the relationship is within a normal range). In addition, the presence or absence of abnormality of the EGR valve 19 (EGR system) can be diagnosed from the comparison result between the EGR valve flow rate coefficient and the threshold. For example, it can be seen whether the relationship between the corrected EGR rate (the EGR rate estimation value output by the Kalman filter 420) and the EGR valve opening does not deviate from the relationship assumed in advance.

In addition, the abnormality diagnosis unit 1207 may predict (predictive diagnosis) a period until the learned value reaches a threshold for determining an abnormal state set for each value on the basis of a time change (for example, a change amount per predetermined time) in the learned value of the throttle valve flow rate coefficient, the EGR valve flow rate coefficient, and the cylinder intake efficiency output from the learning device 450. The abnormality diagnosis unit 1207 outputs a warning display lamp 22 or the like based on the predicted period or stores the same in the storage unit 24. Note that, in the predictive diagnosis, a period until the learned value reaches the first threshold may be predicted in a case where the learned value exceeds a second threshold lower than the threshold (first threshold).

[Function Approximation Used in Learning]

Next, a method of function approximation used in each learning of the throttle valve flow rate coefficient, the EGR valve flow rate coefficient, and the cylinder intake efficiency illustrated in FIG. 12 will be described. In learning, a value to be learned is set as an output variable, and an operating state of the internal combustion engine 1 is set as an input variable.

The relationship between the output variable and the input variable is approximated by a binary quadratic polynomial as follows.

[Mathematical Formula 29]

$$y = \beta_0 + \beta_1 x_1 + \beta_2 x_1^2 + \beta_3 x_2 \times \beta_4 x_2^2 + \beta_5 x_1 x_2 \quad (29)$$

Here, y is an output variable, $x_1$ and $x_2$ are input variables, and $\beta_0$ to $\beta_5$ are partial regression coefficients. By setting the square term and the interaction term, learning can be performed in consideration of nonlinearity between input variables. Here, a binary quadratic polynomial is used, but the invention is not limited thereto, and a linear formula, a polynomial having multi-dimensions of three or more dimensions, a polynomial having higher-order terms of third or higher orders, a polynomial having alternation terms of three dimensions/second or higher orders, and a polynomial combining these elements can also be used. Furthermore, a similar effect is obtained by applying an approximation method (radiation basis function network approximation) by superposition of radiation basis functions or by updating a map or a table value.

When the polynomial is organized by the partial regression coefficient vector θ and the input variable vector φ, the polynomial can be expressed by Formula (30).

[Mathematical Formula 30]

$$y = \varphi^T \theta \quad (30)$$

$$\theta = \begin{bmatrix} \beta_0 \\ \beta_1 \\ \beta_2 \\ \beta_3 \\ \beta_4 \\ \beta_5 \end{bmatrix}, \varphi = \begin{bmatrix} 1 \\ x_1 \\ x_1^2 \\ x_2 \\ x_2^2 \\ x_1 x_2 \end{bmatrix}$$

For example, in the learning of the throttle valve flow rate coefficient, as shown in Formula (31), the throttle valve flow rate coefficient T-th is set as the output variable y, and the rotation speed $N_e$ and the throttle valve opening $\varphi_{th}$ are set as the input variables $x_1$ and $x_2$. The values of the throttle valve flow rate coefficient $\mu_{th}$ and the EGR valve flow rate coefficient $\mu_{egr}$ decrease when a deposit adheres to each valve. As a result, the throttle valve flow rate coefficient reflecting the current operating state is learned. Note that the input variable (operating state) is merely a desirable example, and is not limited to this example.

[Mathematical Formula 31]

$$y = \mu_{th} x_1 = N_e x_2 = \varphi_{th} \quad (31)$$

For example, in the learning of the EGR valve flow rate coefficient, as shown in Formula (32), the EGR valve flow rate coefficient $\mu_{egr}$ is set as the output variable y, and the rotation speed $N_e$ and the EGR valve opening $\varphi_{egr}$ are set as the input variables $x_1$ and $x_2$. As a result, learning of the EGR valve flow rate coefficient reflecting the current operating state is performed. Note that the input variable (operating state) is merely a desirable example, and is not limited to this example.

[Mathematical Formula 32]

$$y = \mu_{egr} x_1 = N_e x_2 = \varphi_{egr} \quad (32)$$

For example, in learning of the cylinder intake efficiency, as shown in Formula (33), the cylinder intake efficiency $\eta_{in}$ is set as the output variable y, and the rotation speed $N_e$ and the intake pipe pressure p m are set as the input variables $x_1$ and $x_2$. As a result, learning of the cylinder intake efficiency reflecting the current operating state is performed. Note that the example of the input variable (operating state) is merely a desirable example, and is not limited to this example.

[Mathematical Formula 33]

$$y = \eta_{in} x_1 = N_e x_2 = p_m \quad (33)$$

Hereinafter, a method for sequentially updating the partial regression coefficient vector θ based on the relationship between the input and the output will be described. Note that, in FIG. 13 and Formulas (34) and (36), the partial regression coefficient vector is represented by a symbol ∧ above θ.

[System Identification]

Figure 13:
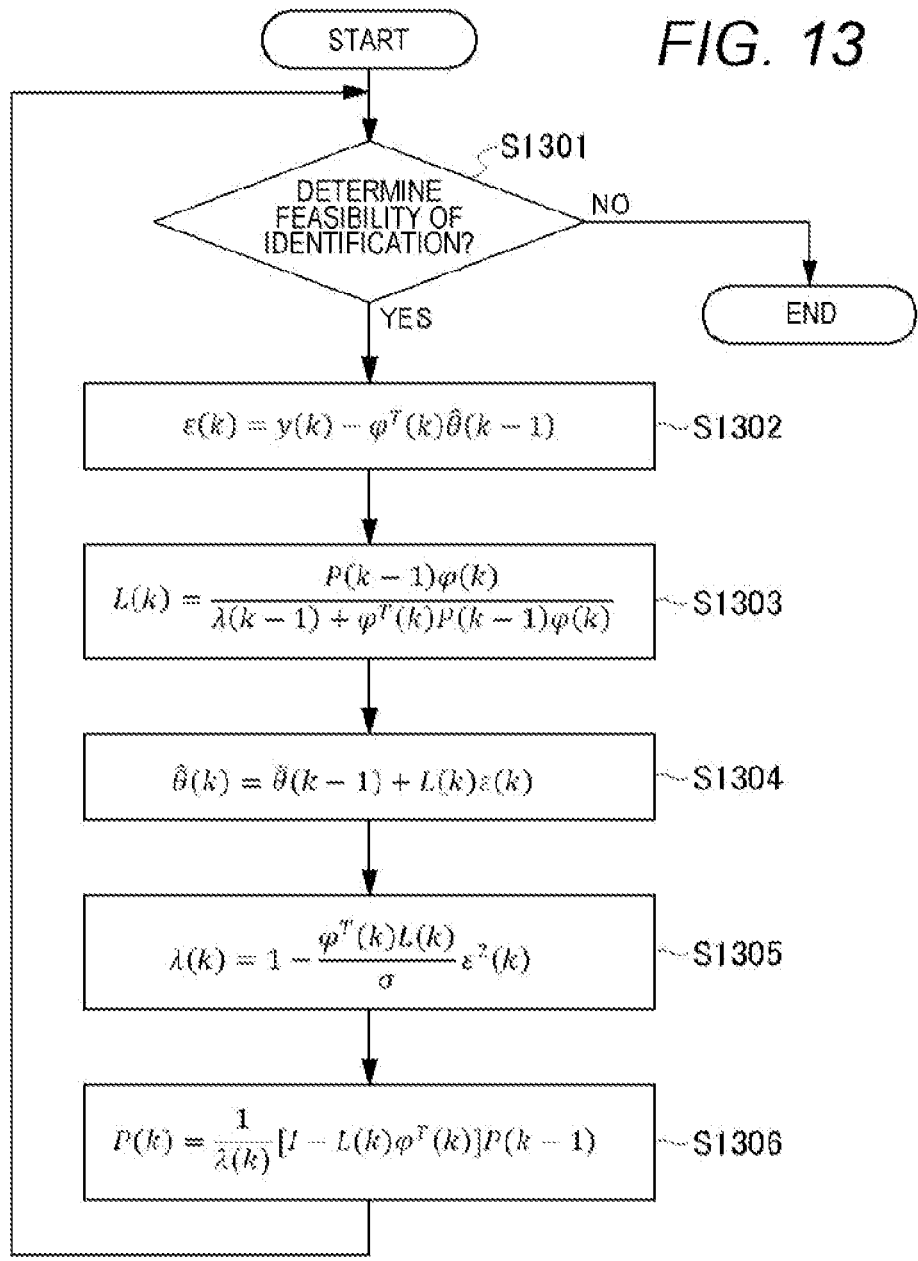
FIG. 13 is a flowchart illustrating an example of a sequential least squares algorithm for system identification.

FIG. 13 is a flowchart illustrating an example of a sequential least squares algorithm for system identification by the learning device 450 (throttle valve flow rate coefficient system identification unit 1204, EGR valve flow rate coefficient system identification unit 1205, and cylinder intake efficiency system identification unit 1206).

When executing the system identification (sequential least squares algorithm) by the learning device 450, the control unit 23 of the ECU 21 determines whether or not the system identification can be executed (S1301). Similarly to step S1101, the sensor state and the prediction range of the assumed state equation are considered as the determination index of the feasibility of execution. When determining that the system identification cannot be executed (NO in S1301), the control unit 23 ends the processing of this flowchart. When determining that the system identification can be executed (YES in S1301), the control unit proceeds to step S1302. Hereinafter, calculation formulas executed in steps S1302 to S1306 are specifically shown.

Here, the target intake system is a time-varying system, and in order to cope with this, a sequential identification algorithm including a variable forgetting element is adopted. The forgetting element is a function of exponentially reducing the influence of past data according to the age. By adopting the forgetting element, the influence of the latest state of the engine system can be appropriately considered for the partial regression coefficient vector (adjustment parameter). Furthermore, by setting the variable forgetting, it is possible to actively use the past data by bringing the forgetting element close to 1 in the steady state while forgetting the past data in the transient state. Hereinafter, a sequential least squares algorithm with a variable forgetting element is shown. First, the learning device 450 (FIG. 4) of the control unit 23 obtains a difference between the polynomial and the output value for each output variable as an error ε(k) by Formula (34) (S1302). The error ε(k) is a difference between the polynomial approximation value and the actual value (the output value of calculation units 1201 to 1203), and the partial regression coefficient vector θ(k) (symbol ∧ is written on θ in the drawing and the equation) is updated so that the difference becomes 0 in the following.

[Mathematical Formula 34]

$$\varepsilon(k) = y(k) - \varphi^T(k)\hat{\theta}(k-1) \quad (34)$$

Next, the learning device 450 obtains L(k) from the covariance matrix P(k−1), the input vector φ(k), and the forgetting element λ(k) by Formula (35) (S1303). Then, based on L(k) and the error E(k), the learning device 450 updates the partial regression coefficient vector θ(k) (symbol ∧ is described on θ in the drawing and the formula) as needed by Formula (36) (S1304).

[Mathematical Formula 35]

$$L(k) = \frac{P(k-1)\varphi(k)}{\lambda(k-1) + \varphi^T(k)P(k-1)\varphi(k)} \quad (35)$$

[Mathematical Formula 36]

$$\hat{\theta}(k) = \hat{\theta}(k-1) + L(k)\varepsilon(k) \quad (36)$$

At this time, the learning device 450 obtains the forgetting element λ(k) and the covariance matrix P(k) by Formulas (37) and (38), respectively (S1305, S1306).

[Mathematical Formula 37]

$$\lambda(k) = 1 - \frac{\varphi^T(k)L(k)}{\sigma}\varepsilon^2(k) \quad (37)$$

[Mathematical Formula 38]

$$P(k) = \frac{1}{\lambda(k)}\left[I - L(k)\varphi^T(k)\right]P(k-1) \quad (38)$$

Here, σ in Formula (37) is an adjustment parameter of the forgetting element λ(k) at the time of learning. An alphabet "I" of Formula (38) is a unit matrix, and is a matrix in which the number of state variables (here, two of intake pipe pressure and intake pipe EGR rate) is set as the number of rows and the number of columns. After completion of the processing of steps 1305 and S1306, the learning device 450 returns to step S1301 and repeats a series of processing at predetermined time intervals.

Note that the parameter identification algorithm of the present embodiment employs a sequential least squares algorithm, but the present invention is not limited thereto. That is, even when other optimization methods such as a gradient method and a genetic algorithm are applied as the parameter identification algorithm, a similar or close effect is obtained.

[Control of Throttle Valve Opening and EGR Valve Opening and Effect Thereof]

Next, the control operation of the throttle valve opening and the EGR valve opening for realizing the target torque and the target EGR rate and the effects thereof will be described with reference to FIGS. 14 to 16.

(Deposit Adhesion to Throttle Valve, Kalman Filter)

Figure 14:
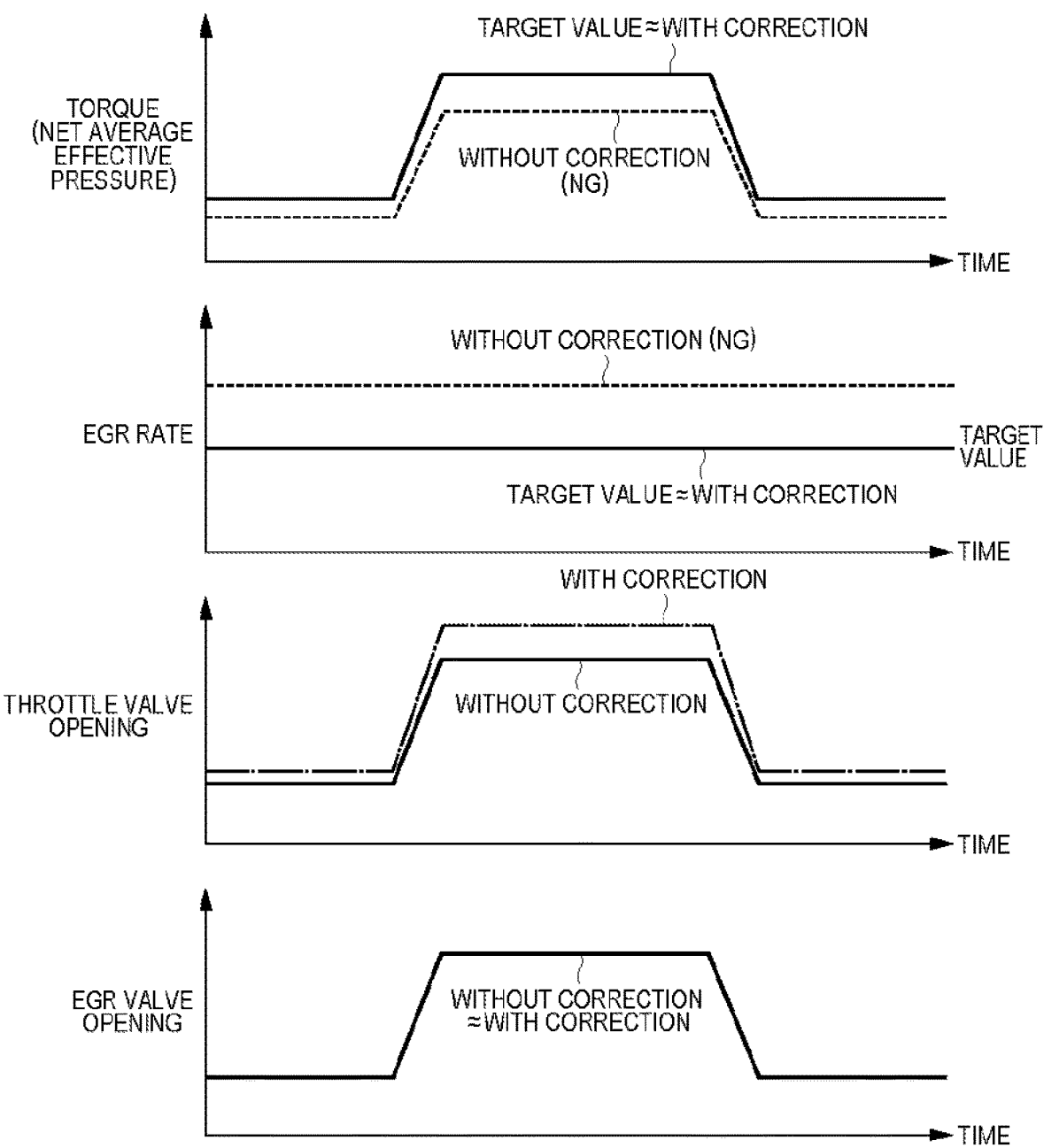
FIG. 14 is a diagram for explaining a control operation and an effect thereof in a case where a deposit adheres to a throttle valve in control of a throttle valve opening and an EGR valve opening for realizing a target torque and a target EGR rate.

FIG. 14 illustrates a control operation and an effect thereof in a case where a deposit adheres to the throttle valve 4 in the control of the throttle valve opening and the EGR valve opening for realizing the target torque and the target EGR rate. In FIG. 14, the graphs from the first stage to the fourth stage indicate the increase/decrease in torque (net average effective pressure) and the EGR rate, and the change in the throttle valve opening and the EGR valve opening with respect to the increase/decrease in torque and the EGR rate, respectively. The same applies to FIGS. 15 and 16 described later.

In a case where there is no deposit adhesion, when the target torque is increased or decreased like a rectangular wave (solid line in the first stage) in a state where the target EGR rate is fixed (solid line in the second stage), the throttle valve opening and the EGR valve opening increase as the target torque increases (solid line in the third stage) and the EGR valve opening increases (solid line in the fourth stage). On the other hand, when there is no change in the throttle valve opening and the EGR valve opening when the deposit adheres to the throttle valve 4, the flow of air passing through the throttle valve 4 is blocked and the amount of air decreases, whereas the exhaust gas in the EGR pipe 15 relatively increases and the EGR rate increases (broken line in the second stage).

On the other hand, when the internal state feedback is performed by the Kalman filter 420 based on the measurement values of the air flow sensor 3 and the intake pipe pressure sensor 6, the throttle valve opening and the EGR valve opening are corrected so that the throttle valve opening is increased (dashed-dotted line in the third stage), and both the torque and the EGR rate can be accurately controlled to target values (solid lines in the first and second stages). By performing the internal state feedback by the Kalman filter 420, it is possible to realize robustness capable of accurately controlling the torque and the EGR rate to target values even when a disturbance in which a deposit adheres to the throttle valve 4 occurs in the intake pipe 31.

(Deposit Adhesion to Throttle Valve and EGR Valve, Kalman Filter)

Figure 15:
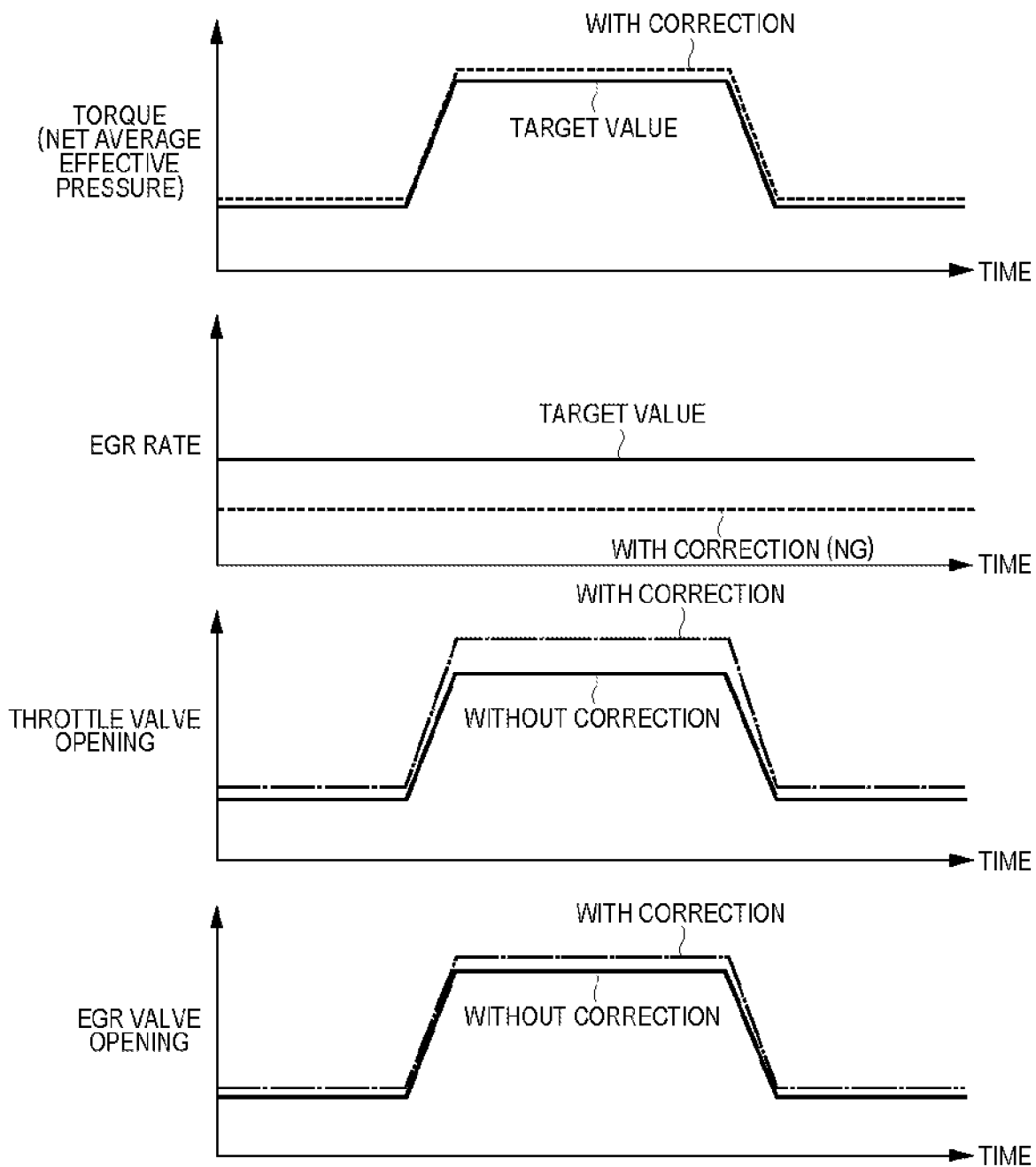
FIG. 15 is a diagram for explaining a control operation (internal state feedback by the Kalman filter) and its effect in a case where deposits adhere to both the throttle valve and the EGR valve in the control of the throttle valve opening and the EGR valve opening for realizing a target torque and a target EGR rate.

FIG. 15 illustrates a control operation (internal state feedback by the Kalman filter 420) and an effect thereof in a case where a deposit adheres to both the throttle valve 4 and the EGR valve 19 in the control of the throttle valve opening and the EGR valve opening for realizing the target torque and the target EGR rate. FIG. 4 shows the transition of the throttle valve opening and the EGR valve opening when the target torque is increased or decreased like a rectangular wave with the target EGR rate fixed.

When the deposit adheres to the throttle valve 4 and the EGR valve 19, the throttle valve opening and the EGR valve opening when the internal state feedback is performed by the Kalman filter 420 based on the measurement values of the air flow sensor 3 and the intake pipe pressure sensor 6 are corrected such that the throttle valve opening and the EGR valve opening are corrected to increase sides (dashed-dotted lines of the third stage and the fourth stage), and the torque can be controlled to be near the target value (increase side) (broken line in the first stage).

On the other hand, the EGR rate greatly changes with an error on the decrease side (broken line in the second stage). The internal state feedback by the Kalman filter 420 cannot appropriately correct the EGR rate with respect to the disturbance in which the deposit adheres to the EGR valve 19. This is because the EGR valve flow rate coefficient of the EGR valve passage flow rate formula (Formula (4)) as a premise in the Kalman filter 420 is different from the actual value (when the influence of deposit adhesion is not considered). Therefore, it is necessary to update the EGR valve flow rate coefficient of the EGR valve passage flow rate formula to an actual value or a value substantially the same as the actual value.

(Deposit Adhesion to Throttle Valve and EGR Valve, Kalman Filter, and System Identification)

Figure 16:
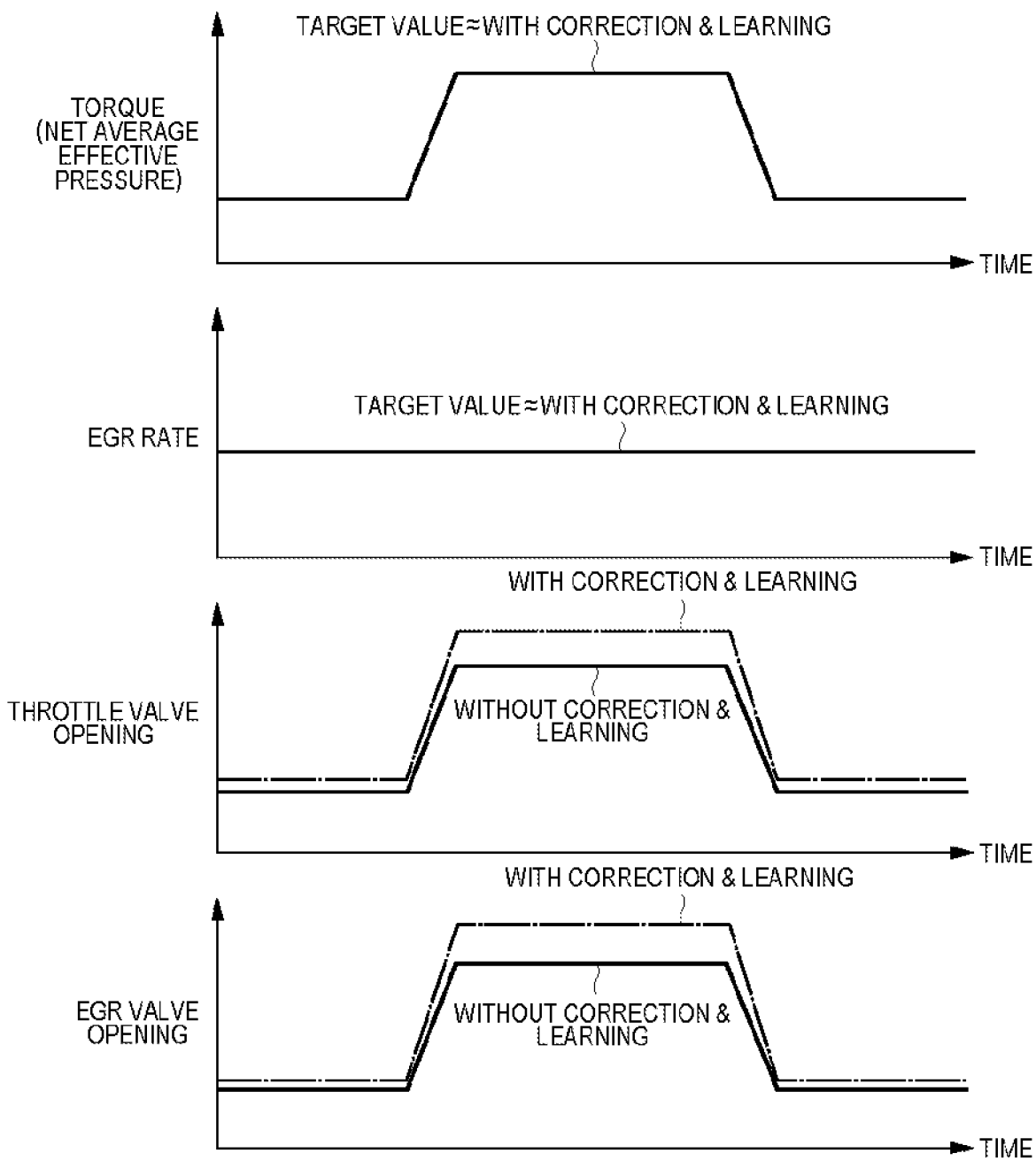
FIG. 16 is a diagram for explaining a control operation (internal state feedback by the Kalman filter and system identification) and an effect thereof in a case where a deposit adheres to both the throttle valve and the EGR valve in the control of the throttle valve opening and the EGR valve opening for realizing a target torque and a target EGR rate.

FIG. 16 is a diagram for explaining a control operation (internal state feedback by the Kalman filter 420 and system identification) and its effect in a case where deposits adhere to both the throttle valve 4 and the EGR valve 19 in the control of the throttle valve opening and the EGR valve opening for realizing the target torque and the target EGR rate. FIG. 4 shows the transition of the throttle valve opening and the EGR valve opening when the target torque is increased or decreased like a rectangular wave with the target EGR rate fixed.

The learning device 450 (the EGR valve flow rate coefficient system identification unit 1205 in FIG. 12) learns a change in the EGR valve flow rate coefficient due to deposit adhesion of the EGR valve 19 and reflects the change in the EGR valve flow rate coefficient in the Kalman filter 420 (Formula (4)). As a result, the information on the state in the intake pipe (intake pipe pressure estimation value, EGR rate estimation value) fed back from the Kalman filter 420 is accurate, and the EGR valve opening correction amount can be calculated more accurately. Therefore, the EGR valve opening is appropriately corrected to the increase side (one-dot chain line in the fourth stage), and both the torque and the EGR rate can be accurately controlled to the target values (solid lines in the first and second stages).

As described above, when learning is performed by the internal state feedback by the Kalman filter 420 and system identification, even in a case where disturbance in which deposits adhere to both the throttle valve 4 and the EGR valve 19 occurs, robustness capable of accurately controlling the torque and the EGR rate to target values can be realized. On the other hand, by learning the change in the EGR valve flow rate coefficient accompanying the deposit adhesion of the throttle valve 4 and the EGR valve 19 and considering the learning result for each feedforward control calculation (FIG. of the throttle valve opening and the EGR valve opening, the control responsiveness can also be improved. In addition, by obtaining the relationship between the valve opening correction amount and the deposit adhesion amount in advance, it is possible to estimate the deposit adhesion amount from the valve opening correction amount.

[Throttle Valve Control and EGR Valve Control]

Figure 17:
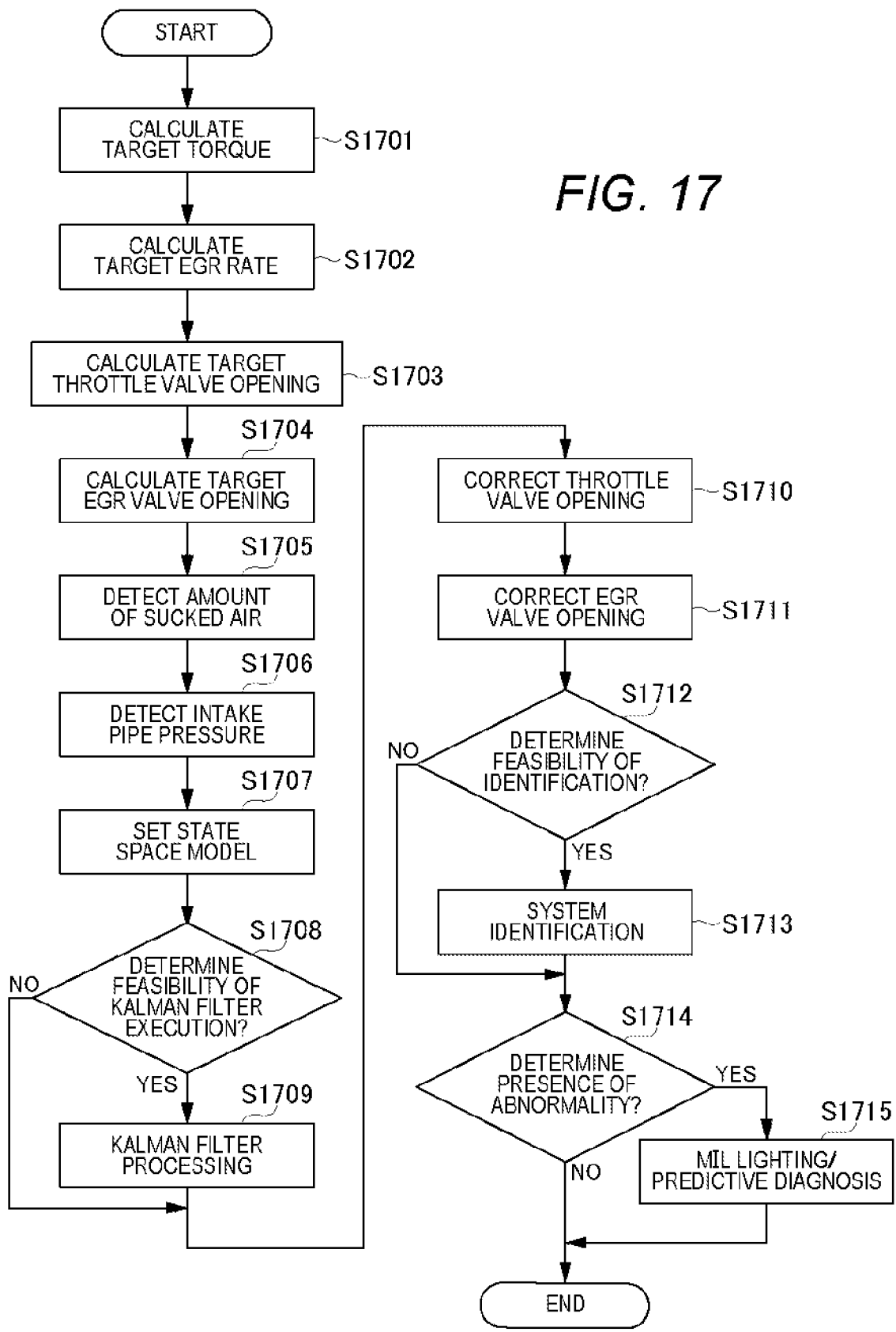
FIG. 17 is a flowchart illustrating an example of a procedure for executing throttle valve control and EGR valve control based on a detection value from an air flow sensor and a detection value from an intake pipe pressure sensor.

FIG. 17 is a flowchart illustrating an example of a procedure for executing the throttle valve control and the EGR valve control based on the detection value from the air flow sensor 3 and the detection value from the intake pipe pressure sensor 6.

First, the control unit 23 (target torque calculation unit 501) of the ECU 21 calculates the target torque of the internal combustion engine 1 based on states such as the accelerator pedal depression amount of the driver, the rotation speed of the internal combustion engine 1, and the external required torque (S1701).

Next, the control unit 23 (target EGR rate calculation unit 504) calculates a target EGR rate from the rotation speed of the internal combustion engine 1 and the target torque (S1702).

Next, the control unit 23 (target throttle valve opening calculation unit 503) calculates a feedforward control amount of the target throttle valve opening based on the target torque obtained in step S1701 (S1703).

Next, the control unit 23 (target EGR valve opening calculation unit 505) calculates a feedforward control amount of the target EGR valve opening based on the target EGR rate obtained in step S1702 (S1704).

Next, the control unit 23 detects the amount of air sucked into the internal combustion engine 1 by the air flow sensor 3 (S1705). Next, the control unit 23 detects the pressure in the intake manifold 5 by the intake pipe pressure sensor 6 (S1706).

Next, the control unit 23 (state space model setting unit 410) sets a state space model (matrix, input/output/state vector) based on the physical model describing the intake pipe internal state (S1707).

Next, the control unit 23 determines whether to perform the internal state feedback control using the Kalman filter 420 based on the sensor state and the intake pipe internal state (S1708). The control unit 23 sets the execution permission flag to "1" (ON) when determining that execution is permitted, and sets the execution permission flag to "0" (OFF) when determining that execution is not permitted. When the execution permission flag is "1" (YES in S1708), the control unit 23 executes the processing of the Kalman filter 420 (intake pipe state estimation unit 421 and state observer 422) and estimates the intake pipe pressure and the EGR rate indicating the intake pipe internal state (S1709). As described above, the processing of the Kalman filter 420 is performed based on the detection value from the air flow sensor 3, the detection value from the intake pipe pressure sensor 6, and the state space model (matrix, input/output/ state vector) (see FIG. 8).

On the other hand, when the execution permission flag is "0" (NO in S1708), the control unit 23 executes a state space model (intake pipe internal state estimation unit 421) to estimate the intake pipe pressure and the EGR rate indicating the intake pipe internal state. The estimation values of the intake pipe pressure and the EGR rate are values not corrected (corrected) by the state observer 422 of the Kalman filter 420.

Next, after the NO determination in step S1708 or the processing in step S1709, the control unit 23 (valve correction amount calculation unit 440) corrects the throttle valve opening and the EGR valve opening based on the estimation values of the intake pipe pressure and the EGR rate indicating the above-described intake pipe internal state (S1710, S1711). That is, the throttle valve opening correction amount calculation unit 806 calculates the throttle valve opening correction amount based on the estimation value of the intake pipe pressure and the target intake pipe pressure, and the EGR valve opening correction amount calculation unit 805 calculates the EGR valve opening correction amount based on the estimation value of the EGR rate and the target EGR rate (FIG. 8).

Next, the control unit 23 determines whether system identification can be executed by the sequential least squares algorithm on the basis of the sensor state and the intake pipe internal state (S1712). The control unit 23 sets the system identification permission flag to "1" (ON) in a case where it is determined that system identification is possible (YES in S1712), and sets the system identification permission flag to "0" (OFF) in a case where it is determined that system identification is impossible (NO in S1712). Then, when the system identification permission flag is "1" (YES in S1712), the control unit 23 executes system identification by the learning device 450 (S1713). Here, as the learning device 450, the throttle valve flow rate coefficient system identification unit 1204, the EGR valve flow rate coefficient system identification unit 1205, and the cylinder intake efficiency system identification unit 1206 (FIG. 12) each execute system identification. As a result, the throttle valve flow rate coefficient, the EGR valve flow rate coefficient, and the cylinder intake efficiency are updated to the latest values. When the system identification permission flag is "0" (NO in S1712), the control unit 23 does not execute system identification and proceeds to step S1724.

The learning device 450 (each system identification unit) determines whether system identification is completed based on the update status of the adjustment parameter of the state space model (the temporal change amount of the adjustment parameter is equal to or less than a predetermined value). In a case where the identification is not completed, the adjustment parameter changes when the input and the output change. Therefore, even if the input and the output fluctuate, it can be determined that the identification is completed when the fluctuation of the adjustment parameter is small. Therefore, in a case where it is determined that the system identification is not completed, the learning device 450 continues the system identification processing. Then, the learning device 450 updates the adjustment parameter (model constant) of the state space model when the system identification is completed.

Next, after the NO determination in step S1712 or the processing in step S1713, the control unit 23 (abnormality diagnosis unit 1207) performs abnormality determination of the throttle valve 4 and the EGR valve 19 (EGR system) according to whether or not the latest values of the throttle valve flow rate coefficient, the EGR valve flow rate coefficient, and the cylinder intake efficiency exceed the respective set thresholds (S1714).

When the abnormality diagnosis unit 1207 determines that the throttle valve 4 or the EGR valve 19 is abnormal (YES in S1714), the control unit 23 notifies the outside (for example, a warning display lamp 22 (MIL)) that the throttle valve 4 or the EGR valve 19 is abnormal as a diagnosis result. Alternatively, the control unit 23 notifies the outside of information (predictive diagnosis result) indicating that the latest value of the throttle valve flow rate coefficient, the EGR valve flow rate coefficient, or the cylinder intake efficiency is approaching a threshold (S1715). The control unit 23 stores information on the state at the time of the abnormality in the storage unit 24 of the ECU 21.

Next, when it is determined in step S1714 that there is no abnormality in the throttle valve 4 or the EGR valve 19 (NO in S1714), or after the processing of step S1715 is ended, the control unit 23 ends the processing of this flowchart.

By repeatedly executing the above-described steps S1701 to S1715 at set time intervals, it is possible to realize robustness capable of accurately controlling the torque and the EGR rate to be target values even in a case where a disturbance such as a deposit adheres to both the throttle valve 4 and the EGR valve 19.

As described above, the electronic control unit (ECU 21) according to the present embodiment is an electronic control unit that controls an engine including an EGR system including an EGR pipe (EGR pipe 15) that returns part of exhaust gas from an internal combustion engine to an intake pipe and an EGR valve (EGR valve 19) disposed in the EGR pipe, an air flow sensor (air flow sensor 3) that detects a flow rate of air taken into the intake pipe, a throttle valve (throttle valve 4) provided on a downstream side of the air flow sensor, and an intake pipe pressure sensor (intake pipe pressure sensor 6) that is provided on a downstream side of the throttle valve and on a downstream side of a connection portion between the intake pipe and the EGR pipe and detects an intake pipe pressure that is a pressure downstream of the throttle valve in the intake pipe. The electronic control unit (ECU 21) includes a state estimation unit (intake pipe internal state estimation unit 421) that estimates the intake pipe pressure ($p_m$) and the EGR rate (W based on the detection value from the air flow sensor and the EGR valve opening ($\varphi_{egr}$), and an estimation value correction unit (state observer 422) that corrects the EGR rate estimation value estimated by the state estimation unit based on the detection value from the intake pipe pressure sensor and the intake pipe pressure estimation value estimated by the state estimation unit.

Furthermore, in the present embodiment, the Kalman filter (Kalman filter 420) is applied to at least the estimation value correction unit (state observer 422).

According to the present embodiment configured as described above, the estimation value correction unit corrects the EGR rate estimation value based on the detection value from the intake pipe pressure sensor and the intake pipe pressure estimation value. As a result, it is possible to maintain high EGR control accuracy, and it is possible to prevent combustion defects such as knock and misfire of the internal combustion engine due to the EGR control error. Furthermore, since the target EGR rate is suppressed from varying in the decreasing direction, the fuel consumption can be reduced.

In addition, the present invention is not limited to the above-described embodiments, and it goes without saying that various other application examples and modifications can be taken without departing from the gist of the present invention described in the claims. For example, the above-described embodiments describe the configurations of the electronic control device and the engine control system in detail and specifically in order to describe the present invention in an easy-to-understand manner, and are not necessarily limited to those including all the components described above. In addition, it is also possible to add, replace, or remove other components for a part of the configuration of the above-described embodiment.

In the above-described embodiment, an example in which the present invention is applied to an engine system without a supercharger has been described, but the present invention is not limited to this example. For example, if a control model of an engine system including a supercharger is created, the present invention can be applied to an engine system including a supercharger.

Furthermore, the functions of the Kalman filter 420 and the learning device 450 may be configured as one integrated function, or the Kalman filter 420 and the learning device 450 may be integrally configured. In addition, some or all of the configurations, functions, processing units, and the like of the above-described embodiments may be realized by hardware, for example, by designing with an integrated circuit. A field programmable gate array (FPGA), an application specific integrated circuit (ASIC), or the like may be used as the hardware.

Figure 11:
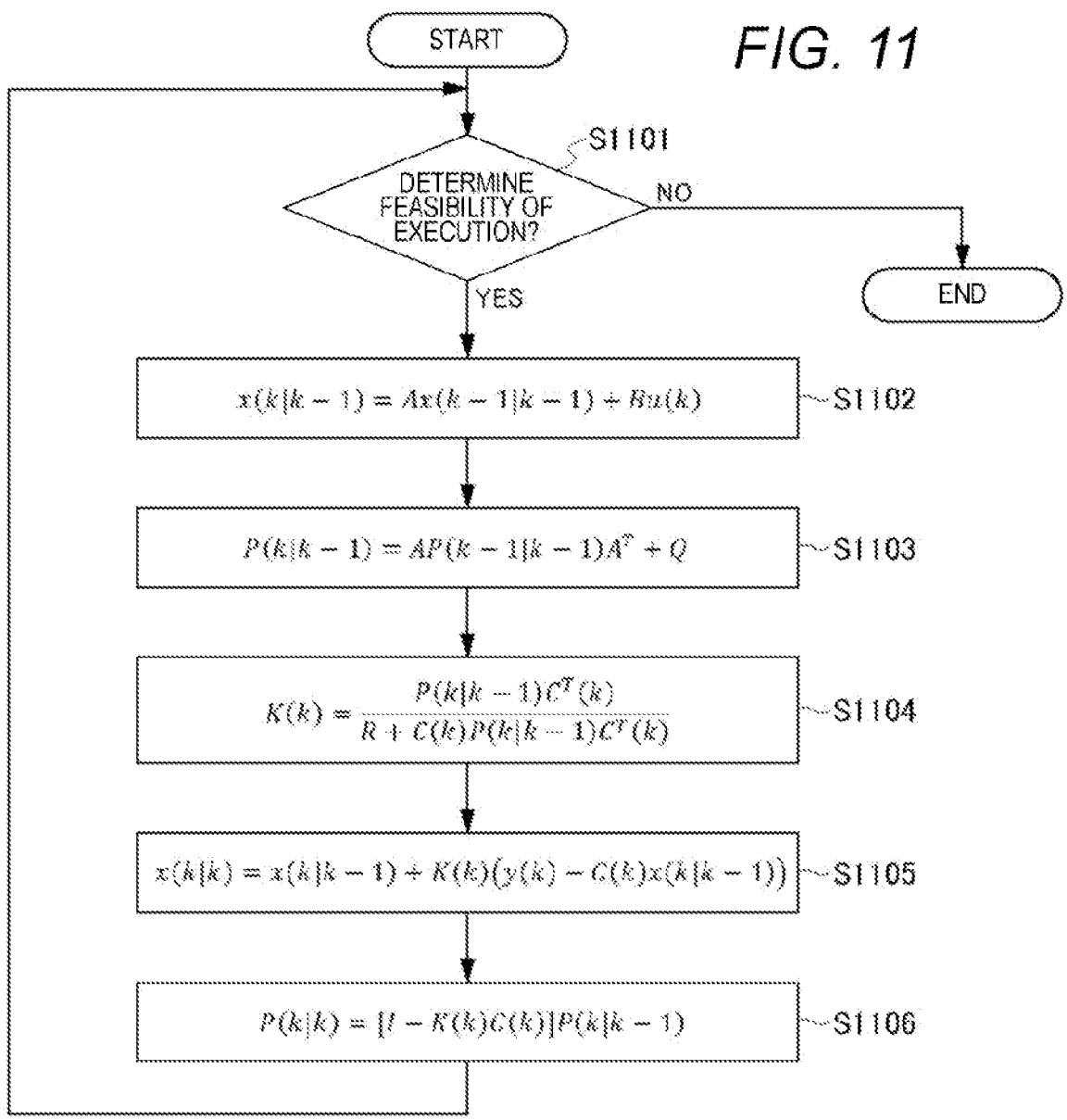
FIG. 11 is a flowchart illustrating an example of a Kalman filter algorithm.

Furthermore, in the flowcharts illustrated in FIGS. 11, 13, and 17, a plurality of processes may be executed in parallel or the processing order may be changed within a range not affecting the processing result.

REFERENCE SIGNS LIST 1 internal combustion engine
3 air flow sensor
4 throttle valve
5 intake manifold
6 intake pipe pressure sensor
12 fuel injection valve
13 spark plug
15 EGR pipe
17 EGR temperature sensor
18 EGR valve upstream pressure sensor
19 EGR valve
21 ECU
22 warning display lamp
23 control unit
24 storage unit
31 intake pipe
32 exhaust pipe
410 state space model setting unit
420 Kalman filter
421 intake pipe internal state estimation unit
422 state observer
430 combustion control unit
440 valve correction amount calculation unit
450 learning device (system identification)
803 EGR valve passage flow rate calculation unit
804 cylinder suction flow rate calculation unit
805 EGR valve opening correction amount calculation unit
806 throttle valve opening correction amount calculation unit
1204 throttle valve flow rate coefficient system identification unit
1205 EGR valve flow rate coefficient identification unit
1206 cylinder intake efficiency system identification unit
1207 abnormality diagnosis unit

The invention claimed is:

1. An electronic control device that controls an engine including an EGR system that includes an EGR pipe that returns a part of exhaust gas of an internal combustion engine to an intake pipe and an EGR valve disposed in the EGR pipe, an air flow sensor that detects a flow rate of air taken into the intake pipe, a throttle valve provided on a downstream side of the air flow sensor, and an intake pipe pressure sensor that is provided on a downstream side of the throttle valve and on a downstream side of a connection portion between the intake pipe and the EGR pipe and detects an intake pipe pressure that is a pressure downstream of the throttle valve in the intake pipe, the electronic control device comprising:
- a state estimation unit that estimates the intake pipe pressure and an EGR rate based on a detection value from the air flow sensor and an EGR valve opening; and
- an estimation value correction unit that corrects an EGR rate estimation value estimated by the state estimation unit based on a detection value from the intake pipe pressure sensor and an intake pipe pressure estimation value estimated by the state estimation unit.

2. The electronic control device according to claim 1, wherein a Kalman filter is applied to the estimation value correction unit.

3. The electronic control device according to claim 2, further comprising an EGR valve opening correction amount calculation unit that calculates a correction amount of the EGR valve opening based on the EGR rate estimation value corrected by the estimation value correction unit and a target EGR rate.

4. The electronic control device according to claim 3, further comprising a learning device that learns a relationship between an EGR valve flow rate coefficient obtained based on the EGR rate estimation value corrected by the estimation value correction unit and the EGR valve opening.

5. The electronic control device according to claim 4, wherein a polynomial in which an output variable is the EGR valve flow rate coefficient and an input variable is an operating state of the internal combustion engine, and a sequential least squares algorithm for identifying a partial regression coefficient included in the polynomial are applied to the learning device.

6. The electronic control device according to claim 5, wherein in the learning of the EGR valve flow rate coefficient, the operating state of the internal combustion engine as the input variable is at least a rotation speed of the internal combustion engine and the EGR valve opening.

7. The electronic control device according to claim 4, further comprising an abnormality diagnosis unit that compares the EGR valve flow rate coefficient learned by the learning device with a threshold for determining an abnormal state and diagnoses abnormality of the EGR system based on a comparison result.

8. The electronic control device according to claim 4, further comprising an abnormality diagnosis unit that predicts a period until the learning value reaches an abnormal state based on a temporal change in a learning value output by the learning device and a threshold for determining an abnormal state.

9. The electronic control device according to claim 2, wherein the estimation value correction unit corrects the intake pipe pressure estimation value estimated by the state estimation unit based on the detection value from the intake pipe pressure sensor and the intake pipe pressure estimation value estimated by the state estimation unit, the electronic control device further comprising a throttle valve opening correction amount calculation unit that calculates a correction amount of a throttle valve opening based on the intake pipe pressure estimation value corrected by the estimation value correction unit and a target intake pipe pressure defined by a target torque and a target EGR rate.

10. The electronic control device according to claim 9, further comprising a learning device that learns a relationship among a throttle valve flow rate coefficient obtained based on the intake pipe pressure estimation value corrected by the estimation value correction unit, a detection value from the air flow sensor, and a throttle valve opening.

11. The electronic control device according to claim 10, wherein a polynomial in which an output variable is the throttle valve flow rate coefficient and an input variable is an operating state of the internal combustion engine, and a sequential least squares algorithm for identifying a partial regression coefficient included in the polynomial are applied to the learning device.

12. The electronic control device according to claim 11, wherein in the learning of the throttle valve flow rate coefficient, the operating state of the internal combustion engine as the input variable is at least a rotation speed of the internal combustion engine and the throttle valve opening.

13. The electronic control device according to claim 10, further comprising an abnormality diagnosis unit that compares the throttle valve flow rate coefficient learned by the learning device with a threshold for determining an abnormal state and diagnoses abnormality of the throttle valve based on a comparison result.

14. An engine control system including an engine and an electronic control device, the engine including an EGR system that includes an EGR pipe that returns a part of exhaust gas of an internal combustion engine to an intake pipe and an EGR valve disposed in the EGR pipe, an air flow sensor that detects a flow rate of air taken into the intake pipe, a throttle valve provided on a downstream side of the air flow sensor, and an intake pipe pressure sensor that is provided on a downstream side of the throttle valve and on a downstream side of a connection portion between the intake pipe and the EGR pipe and detects an intake pipe pressure that is a pressure downstream of the throttle valve in the intake pipe, wherein
the electronic control device includes:
- a state estimation unit that estimates the intake pipe pressure and an EGR rate based on a detection value from the air flow sensor and an EGR valve opening; and
- an estimation value correction unit that corrects an EGR rate estimation value estimated by the state estimation unit based on a detection value from the intake pipe pressure sensor and an intake pipe pressure estimation value estimated by the state estimation unit.

* * * * *